(12) United States Patent
Liljedahl et al.

(10) Patent No.: US 12,277,070 B2
(45) Date of Patent: Apr. 15, 2025

(54) CACHE LINE SUBSCRIPTION

(71) Applicant: Arm Limited, Cambridge (GB)

(72) Inventors: Eric Ola Harald Liljedahl, Stockholm (SE); Jatin Bhartia, Cambridge (GB)

(73) Assignee: Arm Limited, Cambridge (GB)

( * ) Notice: Subject to any disclaimer, the term of this patent is extended or adjusted under 35 U.S.C. 154(b) by 42 days.

(21) Appl. No.: 18/295,866

(22) Filed: Apr. 5, 2023

(65) Prior Publication Data

US 2024/0338323 A1  Oct. 10, 2024

(51) Int. Cl.
*G06F 12/12* (2016.01)
*G06F 12/0891* (2016.01)

(52) U.S. Cl.
CPC .......... *G06F 12/12* (2013.01); *G06F 12/0891* (2013.01)

(58) Field of Classification Search
CPC ...... G06F 12/12; G06F 12/121; G06F 12/122; G06F 12/123; G06F 12/126; G06F 12/127; G06F 12/0895; G06F 12/0891
See application file for complete search history.

(56) References Cited

U.S. PATENT DOCUMENTS

| | | | |
|---|---|---|---|
| 7,873,788 B1 | 1/2011 | Moll et al. | |
| 11,500,797 B2 | 11/2022 | Horwich et al. | |
| 2017/0206173 A1* | 7/2017 | McFearin | G06F 12/0804 |
| 2022/0292024 A1* | 9/2022 | Mittal | G06F 3/0652 |
| 2024/0095176 A1* | 3/2024 | Goodman | G06F 12/0811 |

OTHER PUBLICATIONS

Yang, Juncheng, Yazhuo Zhang, Ziyue Qiu, Yao Yue, and Rashmi Vinayak. "FIFO queues are all you need for cache eviction." In Proceedings of the 29th Symposium on Operating Systems Principles, pp. 130-149. 2023.*
Reineke, Jan, Sebastian Altmeyer, Daniel Grund, Sebastian Hahn, and Claire Maiza. "Selfish-LRU: Preemption-aware caching for predictability and performance." In 2014 IEEE 19th Real-Time and Embedded Technology and Applications Symposium (RTAS), pp. 135-144. IEEE, 2014.*
Lee, Chang-Gun, Joosun Hahn, Yang-Min Seo, Sang Lyul Min, Rhan Ha, Seongsoo Hong, Chang Yun Park, Minsuk Lee, and Chong Sang Kim. "Enhanced analysis of cache-related preemption delay in fixed-priority preemptive scheduling." In Proceedings Real-Time Systems Symposium, pp. 187-198. IEEE, 1997.*
International Search Report and Written Opinion of the International Searching Authority for PCT/GB2024/050469 mailed May 2, 2024, 11 pages.

* cited by examiner

*Primary Examiner* — Tracy A Warren
(74) *Attorney, Agent, or Firm* — NIXON & VANDERHYE P.C.

(57) ABSTRACT

An apparatus with an additional storage element or field is provided where a subscription indicator is stored, indicating a subscription to a region of memory, and hence subscribing to a cache line corresponding to the region of memory. In response to a subscribed cache line being invalidated, the apparatus performs actions to re-fetch the cache line, and to store the cache line in the cache after a short delay. The subscription indicator may be stored in a variety of ways, and may include further information that influences the functionality of the present techniques. Such further information may be adjustable in order to dynamically control the functionality of the disclosed techniques for a particular implementation over time.

19 Claims, 12 Drawing Sheets

CACHE LINE SUBSCRIPTION

TECHNICAL FIELD

The present disclosure relates to data processing. In particular, the present disclosure relates to managing cache lines that are frequently used in data processing.

DESCRIPTION

A data processing apparatus arranged to perform data processing is often required to access data from memory. To improve the speed of memory accesses, a data processing apparatus may be provided with a cache to store frequently accessed data, such that the data can be quickly accessed by execution circuitry of the data processing apparatus. Finite storage capacity of the cache can mean that data may be removed from the cache, even though a future data processing operation may require access to that data. In such cases, an attempt to access that data would result in a cache miss, and the performance of the data processing apparatus would be negatively impacted due to a memory access being necessitated.

SUMMARY

In one example embodiment described herein there is an apparatus comprising: subscription storage circuitry for storage of a subscription indicator indicating a subscription to a region of memory; control circuitry configured to generate, in response to an invalidation in a cache of a cache line holding a data block corresponding to the region of memory for which the subscription is indicated, a re-fetch request specifying the data block after a delay, and to cause the data block to be stored in the cache.

In another example embodiment described herein there is a method comprising: storing a subscription indicator indicating a subscription to a region of memory; generating, in response to an invalidation in a cache of a cache line holding a data block corresponding to the region of memory for which the subscription is indicated, a re-fetch request specifying the data block after a delay, and causing the data block to be stored in the cache.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
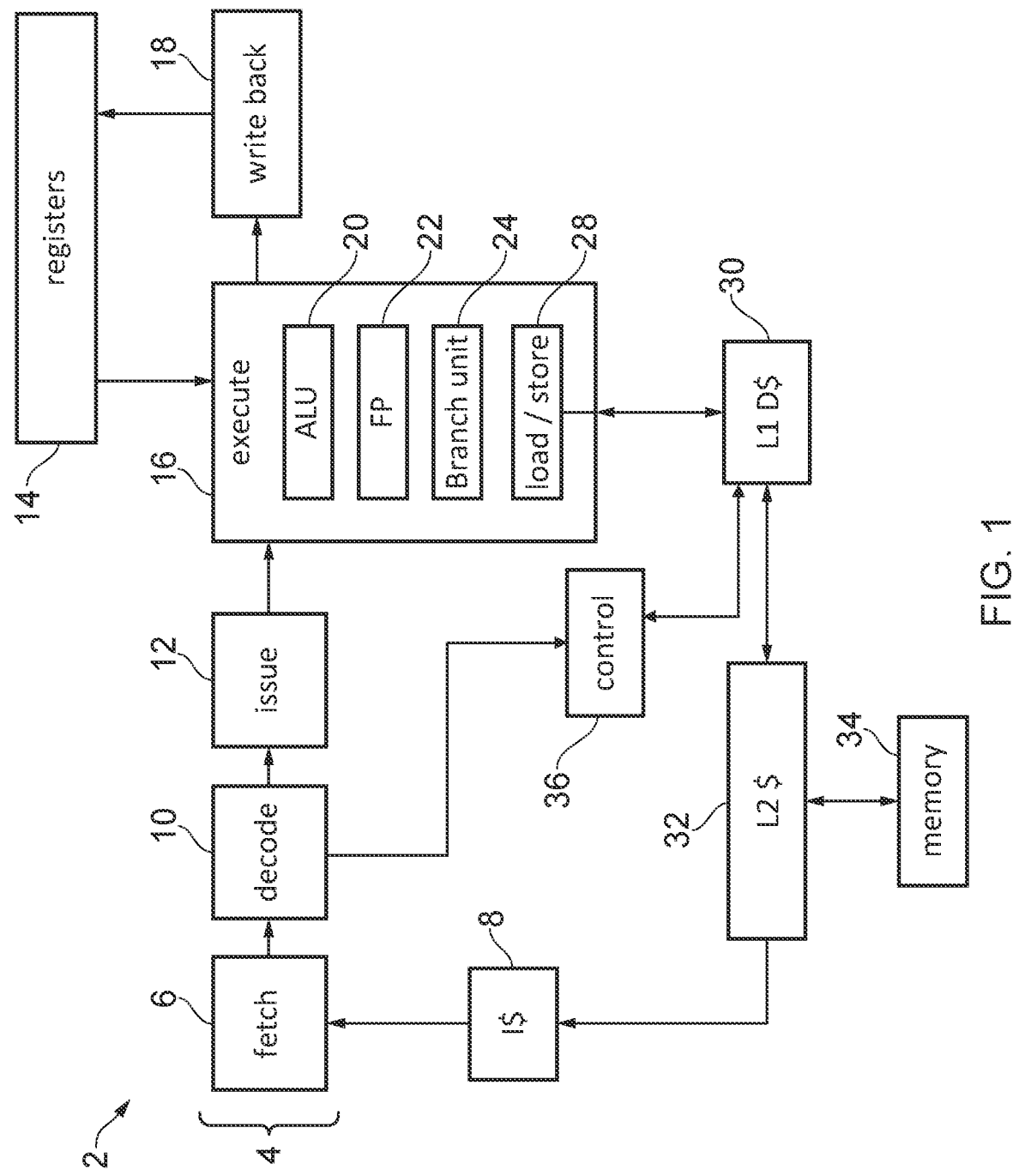
FIG. 1 schematically illustrates an apparatus according to some example embodiments.

Before discussing the embodiments with reference to the accompanying figures, the following description of embodiments is provided.

In accordance with one example configuration there is provided an apparatus comprising: subscription storage circuitry for storage of a subscription indicator indicating a subscription to a region of memory; control circuitry configured to generate, in response to an invalidation in a cache of a cache line holding a data block corresponding to the region of memory for which the subscription is indicated, a re-fetch request specifying the data block after a delay, and to cause the data block to be stored in the cache.

A data processing apparatus may be provided with a cache, in which frequently accessed data can be stored and accessed with low latency in the future. While a cache line is stored in the cache, various signals may request for that cache line to be invalidated, for example according to a coherence protocol. A disadvantage of this is that if the data processing apparatus executes a data processing instruction that requires that cache line in future, a lookup in that cache would result in a miss. This has a further effect of needing to retrieve the data from other levels of a cache hierarchy or from main memory, thus increasing latency and reducing performance.

The present techniques allow for a data processing apparatus to store an indicator to indicate that a data block in memory is particularly important for a current program. For example, the program may frequently make use of that data block during execution of a sequence of instructions. In cases such as this a subscription indicator may be stored in the subscription storage circuitry indicating a subscription to the region of memory storing that data block. A cache line that contains that data block may be referred to as a 'subscribed' cache line herein. In some examples, the data block is split among a plurality of cache lines, in which case each of the plurality of cache lines would be subscribed cache lines.

The control circuitry is configured to perform actions directed to keeping subscribed cache lines in the cache where possible. In particular, in response to an invalidation causing a subscribed cache line to be invalidated, the control circuitry is configured to generate a re-fetch request specifying the data block. In doing so, the subscribed cache line is stored in the cache again, reducing the time in which a miss could occur.

The control circuitry is configured to wait for a delay before generating the re-fetch request to allow whatever function caused the invalidation to be completed. For example, where the invalidation is caused by a further data processing apparatus for the purpose of modifying the cache line, the delay allows the further data processing apparatus to have enough time to complete the modification. Such a delay may be a predetermined delay, either programmable or determined by hardware, or alternatively the delay may be variable.

It will be appreciated that, where there is a cache hierarchy in place (e.g. an L1 cache, an L2 cache, etc), a subscribed cache line may be in any cache in the hierarchy. For example, the subscribed cache line may be a cache line in the L2 cache, and so in response to an invalidation, the control circuitry generates the re-fetch request to cause the subscribed cache line to be reallocated into the L2 cache. In some examples, this is more advantageous than subscribing to cache lines in the L1 cache since the subscribed cache line is still quickly accessible (as compared to a main memory access), but the contents of the L1 cache are unaffected. On the other hand, subscribing to a cache line in the L1 cache will result in a faster access, but with the possibility of causing other useful data to be evicted. In some examples, different caches in a cache hierarchy are indexed differently. In particular, an L1 cache may be indexed by virtual address, whereas an L2 cache may be indexed by physical address. In such examples, the subscription indicator may indicate the region of memory based on a virtual address, physical address, or both, depending on where the subscribed cache line is located.

In some examples, the apparatus is provided with decoding circuitry configured to decode a subscription instruction indicating the region of memory, wherein in response to the subscription instruction, the decoding circuitry is configured to generate control signals which cause the subscription indicator to be stored in the subscription storage circuitry. A programmer or compiler may determine that a program to be executed by a data processing apparatus would frequently make use of a particular data block. A subscription instruction can be added to the program code in order to subscribe to the region of memory. The subscription instruction indicates a region of memory, and a subscription indicator corresponding to that region of memory is then stored in the subscription storage circuitry. The advantages of the subscription, as described above, can then be selectively utilised by the programmer. In some examples, the subscription instruction is a prefetch instruction, and the decoding circuitry is configured to cause the subscription indicator to be stored in response to the prefetch instruction. In such examples, the additional functionality of the subscription instruction is available to the programmer, without requiring an additional instruction encoding.

In some examples, the apparatus is provided with subscription determination circuitry configured to store the subscription indicator in the subscription storage circuitry in response to at least one of: receiving a snoop request indicating an intent to modify the data block; and a number of times that the data block has been allocated to the cache exceeding a threshold within a monitoring period. In such examples, the subscription determination circuitry is configured to identify particular circumstances in which it has been determined that a subscription to a cache line would be beneficial. In particular, if a snoop request is received indicating an intent to modify the data block, storage of a subscription indicator would be beneficial to ensure that the data block is re-fetched quickly after the modification. The subscription determination circuitry is responsive to such a snoop request to store an appropriate subscription indicator in the subscription storage circuitry.

Alternatively, a subscription may be based on a history of cache line allocation. In particular, if a cache line is being repeatedly allocated into and evicted from the cache, it can be inferred that the data block is frequently important to the program. A threshold number of such allocations can be set, using a programmable value or a value defined in hardware, for which a subscription indicator is stored if the number of times the cache line is allocated exceeds that threshold within a particular timeframe.

In some examples, the control circuitry is responsive to storage of the subscription indicator in the subscription storage circuitry to determine whether the data block is currently stored in the cache, and in response to a determination that the data block is not currently validly stored in the cache, the control circuitry is configured to generate a fetch request specifying the data block. The control circuitry generally performs actions to keep a subscribed cache line in the cache where it is possible to do so. As such, it is beneficial to determine whether the subscribed cache line containing the data block is currently stored in the cache, so that the appropriate action can be taken. In some examples, the control circuitry's functionality can be used to emulate a prefetch. In particular, by storing a subscription indicator to subscribe to a cache line that is not currently in the cache, the control circuitry causes the subscribed cache line to be fetched so the data in the cache line can be used by a future data processing instruction.

In some examples, the subscription indicator comprises an indication of the region of memory, and the subscription storage circuitry comprises a storage element separate from the cache. In such examples, the subscription storage circuitry is arranged as a separate storage element allowing the benefits of subscribing to cache lines without incurring an additional storage burden in the cache. It will be appreciated that the region of memory can be indicated in many different ways. For example, the region of memory may be indicated using an absolute memory address, or a relative memory address. Alternatively, the subscription indicator may simply comprise an offset value, where the region of memory is calculated with reference to a register storing a base address.

In some examples, the control circuitry is configured to cancel the subscription indicator in response to storage of a new subscription indicator in the storage element, when the storage element has insufficient storage capacity to store the new subscription indicator in addition to the subscription indicator. The control circuitry may make use of various eviction algorithms in order to cancel subscription indicators in a full storage element. Such eviction algorithms may include 'Least Recently Used' (LRU), 'Least Frequently Used' (LFU), 'First In, First Out' (FIFO), and so on.

In some examples, the subscription indicator is stored in a field of the cache line holding the data block corresponding to the region of memory. In such examples, the subscription storage circuitry is implemented as part of the cache. By storing the subscription indicator in a field of the subscribed cache line itself, a determination of whether a cache line is a subscribed cache line or not can be performed more quickly. Additionally, since information to associate the subscription indicator with the cache line (e.g. a matching memory address) is not necessary, the subscription indicator can be represented using less data.

In some examples, the field of the cache line is configured to store a flag. Such examples would be the simplest and most space-efficient way to indicate a subscription. For example, a single bit is stored in a field of each cache line, and the value of that bit indicates whether the cache line is a subscribed cache line. For example, the flag having a value of 1 indicates that a cache line is a subscribed cache line, whereas a value of 0 indicates that the cache line is not a subscribed cache line.

In some examples, the subscription indicator comprises a delay value; and the delay is based on the delay value. As discussed above, the control circuitry is required to wait for some amount of time before generating a re-fetch request. By incorporating a delay value into the subscription indicator, it is possible to control the length of the delay. Furthermore, the delay may be the same or different for different subscription indicators. This enables a re-fetch request to be generated sooner in response to invalidation of some subscribed cache lines, but later for others. When storing the subscription indicator comprising the delay value, the delay value may be a default initial value, or may be specified by software using a programmable register or the subscription instruction described above.

In some examples, the control circuitry is configured to adjust the delay value in response to a further invalidation of the cache line within a re-invalidation time of the invalidation. In such examples, a subscribed cache line being invalidated twice in relatively quick succession is an indication that the re-fetch request was generated too quickly. For example, where the subscribed cache line is invalidated so it can be modified by a further data processing apparatus, a re-fetch request being generated too quickly would prevent the modification from being performed. However, since the further data processing apparatus still needs to modify the cache line, the cache line would be invalidated again, which then causes yet another re-fetch request. This continues in an endless loop of invalidating and re-fetching, thus stalling the program. By increasing the delay value in response to a further invalidation, this problem is avoided. It will be appreciated that this problem would need to be differentiated from a further invalidation for a different purpose, such as for a subsequent modification to the same subscribed cache line. Therefore, the re-invalidation time is implemented, where the delay value is only increased if the further invalidation is received within a predetermined time period from the initial invalidation.

On the other hand, if a further invalidation is not received within the re-invalidation time then it is possible that the delay value could be decreased without re-introducing the loop of invalidating and re-fetching as described above. Furthermore, if a memory access to the subscribed cache line is requested before the subscribed cache line is re-fetched, a cache miss would occur. This indicates that the re-fetch request is being generated too late. Since a miss would occur for any memory accesses to the subscribed cache line during the time between the invalidation and the re-fetch, there is less likely to be a miss if the subscribed cache line is re-fetched as soon as possible. Hence, if a further invalidation is not received within the invalidation time and a memory access to the subscribed cache line is requested before the re-fetch request, the delay value could be decreased. By increasing or decreasing the delay value as according to the above conditions, the delay value may be dynamically adjusted over time and optimised on an ongoing basis. The dynamic adjustment allows for the delay value to be more suitable for the current state of program execution or a pattern of data accesses.

In some examples, the control circuitry is configured to monitor whether the subscribed cache line is accessed between the re-fetch and the re-invalidation. If so, then generating the re-fetch request after a delay defined by the current delay value was still useful since a cache miss was prevented. On the other hand, if there was no access to the subscribed cache line, then the re-fetch was not useful. The control circuitry may be configured to determine whether to adjust the delay value or how much to adjust the delay value based on whether the subscribed cache line was accessed between the re-fetch and the re-invalidation. For example, if the subscribed cache line was accessed between the re-fetch and the re-invalidation, the control circuitry does not increase the delay value, or increases the delay value by a smaller amount than if the subscribed cache line had not been accessed.

In some examples, the control circuitry is configured to adjust the delay value based on whether the data block is indicated as being read-only or having shared ownership with another processing element or indicated as having been modified by another processing element. In such examples, a data block in a re-fetched cache line can be associated with an indication of whether it has been modified or not by another processing element. For example, cache lines are provided with an additional status bit to indicate whether the cache line had been modified by the immediately previous owner. This indication is then reset each time a new processing element takes ownership of the cache line. Alternatively, the indication may be a multi-bit flag, where the value is incremented whenever the cache line is modified by a different processing element. Hence, the control circuitry is responsive to such an indication when the subscribed cache line is re-fetched, and determines whether the delay value should be increased or decreased. In particular, if the indicator indicates that a previous owner had not modified the subscribed cache line, then the re-fetch request was generated too soon, and the delay value is increased. On the other hand, if the indicator indicates that the previous owner had modified the subscribed cache line, then it is possible to reduce the delay value without introducing the problems with looping invalidations and re-fetches as described above. If a memory access to the subscribed cache line is requested before the re-fetch request, then a miss would occur, indicating that the re-fetch request is generated too late. Hence, if the indication indicates that the immediately previous owner had modified the subscribed cache line, and a memory access to the subscribed cache line is requested before the re-fetch request, the delay value is decreased.

For another example, the indication could indicate whether the cache line has been modified compared with the current state of memory. For example, a data block that has been modified would be indicated as 'modified' or 'dirty', whereas a data block that is identical to the corresponding data in memory would be indicated as 'unmodified' or 'clean'. The control circuitry makes use of this information to determine whether the delay value should be increased or decreased. If a subscribed cache line is re-fetched with the data block marked as 'unmodified', it can be inferred that the re-fetch request was generated too soon, and the delay value can be increased. On the other hand, if the subscribed cache line is re-fetched too late, then a memory access to the subscribed cache line would result in a cache miss. If such a memory access is requested before the subscribed cache line is re-fetched, the delay value can be decreased to reduce the probability of future cache misses. It will be appreciated that the indication of this example would only be useable if it was known that the cache line was 'unmodified' or 'clean' (i.e. identical to the corresponding data in memory) before the invalidation. Otherwise, the subscribed cache line would always be re-fetched with an indication of 'modified' or 'dirty' regardless of whether the cache line had been modified by the further data processing apparatus. Similarly, it will also be appreciated that the indication of this example could not be used where a 'write-through' functionality is implemented, causing all modifications to cache lines to propagate back to memory. When a write-through is used, the subscribed cache line could be re-fetched with an indication of 'unmodified' or 'clean' even though it had been modified by the further data processing apparatus.

The above examples each allow for dynamic adjustment of the delay value over time based on the current state of data processing or a pattern of memory accesses.

In some examples, the subscription indicator comprises a confidence value, wherein in response to the confidence value being below a confidence threshold, the control circuitry is configured to treat the subscription as not indicated. In such examples, an additional layer of control of the subscription indicator is provided, such that the subscription can be treated as indicated or not indicated depending on whether the confidence value exceeds the confidence threshold. When storing the subscription indicator comprising the confidence value, the confidence value may be a default initial value, or may be specified by software using a programmable register or the subscription instruction described above.

In some examples, the control circuitry is configured to increase the confidence value in response to at least one of: the data block being stored in the cache in response to a data processing instruction; and receiving a snoop request specifying the cache line while the cache line is stored in the cache and the subscription indicator is stored in the subscription storage circuitry. The control circuitry generally aims to increase the confidence value in response to events that would reinforce a determination that a data block is of particular importance to a program. In some examples, the confidence value is increased when a data processing instruction causes the subscribed cache line to be brought into the cache, since it is likely that future instructions would also make use of the data in the subscribed cache line. Therefore, it is advantageous to retain the subscription. In examples that also make use of the subscription instruction described above, the confidence value may be increased such that the confidence value exceeds the confidence threshold in response to the subscription instruction. Indeed, the confidence value may be increased to a maximum value.

Furthermore, when a snoop request specifies the cache line, for example as part of a cache coherence protocol, and the cache line is a subscribed cache line, it can be inferred that the subscribed cache line is important to several data processing apparatuses in a data processing system. Therefore, it can be inferred that invalidations may be common in the future, and so subscribing to the cache line would be beneficial. As such, the confidence value can be increased.

By controlling the confidence values over time, it is possible to dynamically adjust the confidence of each subscription indicator to be more suitable for the current state of execution or the pattern of data accesses. For example, by increasing the confidence of some subscriptions over time, those subscriptions can be of higher confidence than other subscriptions. The confidence value can then be used to influence the behaviour of the control circuitry, for example, prioritising re-fetch requests of higher confidence subscriptions over lower confidence subscriptions, or prioritising higher confidence subscription indicators over lower confidence subscription indicators when cancelling a subscription indicator from subscription storage circuitry. The confidence value may also influence the behaviour of other components, such as prioritising the higher confidence subscribed cache lines over other cache lines when the cache determines a victim for eviction.

In some examples, the control circuitry is configured to decrease the confidence value in response to at least one of: an exception and expiry of a subscription aging period. When an exception occurs in a data processing apparatus, a sequence of program instructions will be interrupted so that an exception handling routine can be executed instead. While the exception handling routine is running, a subscribed cache line would likely not be used. Therefore, retaining the cache line in the cache is not beneficial, and instead simply reduces the useable cache capacity for the exception handling routine. Therefore, in such examples, reducing the confidence of the subscription indicator, for example to a minimum value, allows for the subscription to be treated as not indicated by the control circuitry when the exception occurs. In other examples, the control circuitry is configured to track a subscription ageing period. In various examples, the subscription ageing period may be defined by a number of increments to a program counter value or a number of cycles. The control circuitry gradually decreases the confidence value of subscribed cache lines at regular time intervals, such that 'older' subscriptions are eventually no longer treated as indicated. The control circuitry may further monitor accesses to subscribed cache lines, such that frequently accessed cache lines retain a higher confidence value than those which are less frequently accessed. In this way, older and/or less frequently used cache lines are eventually not treated as subscribed cache lines.

In some examples, the control circuitry is configured to move the subscription indicator to further storage circuitry; and in response to a subsequent re-subscription to the region of memory, the control circuitry is configured to move the subscription indicator from the further storage circuitry to the subscription storage circuitry. When the subscription indicator includes a delay value or a confidence value that has been adjusted over time as described above, it would be beneficial to retain these adjusted values if the subscription was cancelled and then later reinstated. Therefore, instead of deleting the adjusted values when cancelling the subscription, they are moved as part of the subscription indicator to further storage circuitry. The further storage circuitry could be any further storage such as a region of main memory. In the event that a subscription is cancelled and later reinstated, for example, when a program is resumed after occurrence of an exception, the adjusted delay and/or confidence values can be replaced in the subscription storage circuitry. Therefore, the delay and/or confidence values are already at the previously adjusted values as opposed to an initial value, thus improving performance after resuming the program.

In some examples, the control circuitry is configured to cancel the subscription indicator in response to the cache line holding the data block corresponding to the region of memory being evicted from the cache. In such examples, the cache line being evicted from the cache may indicate that a data block in the cache line is no longer of particular importance. In which case, the subscription would no longer be necessary.

In some examples, the cache is configured to prioritise evicting a different cache line over the cache line holding the data block corresponding to the region of memory. In such examples, subscribed cache lines are retained in the cache when they would otherwise be evicted. For example, a cache configured to use an LRU eviction algorithm may retain the subscribed cache line, even when the subscribed cache line is the least recently used, by preferentially evicting another unsubscribed cache line which is nonetheless more recently used.

In some examples, the cache is coupled to a processing element; and the invalidation of the cache line is in response to an invalidation request from a further processing element; and the control circuitry is configured to cause the re-fetch request to be sent as a snoop request to the further processing element. A further processing element causes an invalidation request specifying the cache line to be sent, for example, when intending to modify data in the cache line. As such, after the modification, the modified cache line would be in a local cache of the further processing element. By causing the re-fetch request to be sent as a snoop request to the further processing element, the control circuitry is capable of directly accessing the modified cache line and placing the modified cache line back in the cache as quickly as possible, thus reducing the time in which a cache miss could occur. It would be appreciated that without a snoop request, the mechanism for retrieving the modified cache line would be for the control circuitry to wait for the further processing element to write the modified data back to memory, which would take significantly more time, thus increasing the time in which a cache miss could occur.

In some examples, there is provided a data processing system comprising the apparatus of any of the previous examples; a further system component configured to generate an invalidation request, and to send the invalidation request to the apparatus; the apparatus is configured to cause the invalidation of the cache line holding the data block in response to the invalidation request; and the control circuitry is configured to cause the re-fetch request to be sent to the further system component. The data processing system may implement a coherence protocol to cause system components to send invalidation requests to each other for ensuring coherent data. By incorporating previously described examples, the amount of time between invalidating and re-fetching a subscribed cache line is reduced. Therefore, the possibility of a cache miss and the associated memory access latency occurring is also reduced.

In accordance with one example configuration there is provided a method comprising: storing a subscription indicator indicating a subscription to a region of memory; generating, in response to an invalidation in a cache of a cache line holding a data block corresponding to the region of memory for which the subscription is indicated, a re-fetch request specifying the data block after a delay, and causing the data block to be stored in the cache.

Particular embodiments will now be described with reference to the figures.

FIG. 1 schematically illustrates an example of a data processing apparatus 2. The data processing apparatus 2 has a processing pipeline 4, which includes a number of pipeline stages. In this example, the pipeline stages include a fetch stage 6 for fetching instructions from memory 34 to be locally cached in an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage 16. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the processing units may include: an arithmetic/logic unit (ALU) 20 for performing arithmetic or logical operations; a floating-point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34. In this example, the memory system includes a level one (L1) data cache 30, the L1 instruction cache 8, a shared level two (L2) cache 32 and main system memory 34. It will be appreciated that this is just one example of a possible cache hierarchy and other arrangements of caches can be provided. The specific types of processing unit 20 to 28 shown in the execute stage 16 are also just one example, and other implementations may have a different set of processing units or could include multiple instances of the same type of processing unit, so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

According to the present techniques, the data processing apparatus 2 is also provided with control circuitry 36 generally associated with the L1 data cache 30. The control circuitry 36 performs various actions based on whether data in the L1 data cache 30 have been marked as subscribed. The particular functionality of the control circuitry 36 will be described in more detail with references to the figures that follow.

While the control circuitry 36 is shown in FIG. 1 to interact with both the decode stage 10 and the L1 data cache 30, it is not necessary for the control circuitry 36 to interact with both, and in some examples only interacts with the decode stage 10 or the L1 data cache 30, or indeed the control circuitry 36 may interact with other caches in the cache hierarchy. In other examples, the control circuitry interacts with the load/store unit 28 to monitor memory accesses, in particular those that target subscribed cache lines. In still other examples, the control circuitry may interact with the write back stage 18 in order to write data (e.g. subscription indicators) to the register file 14.

Figure 2:
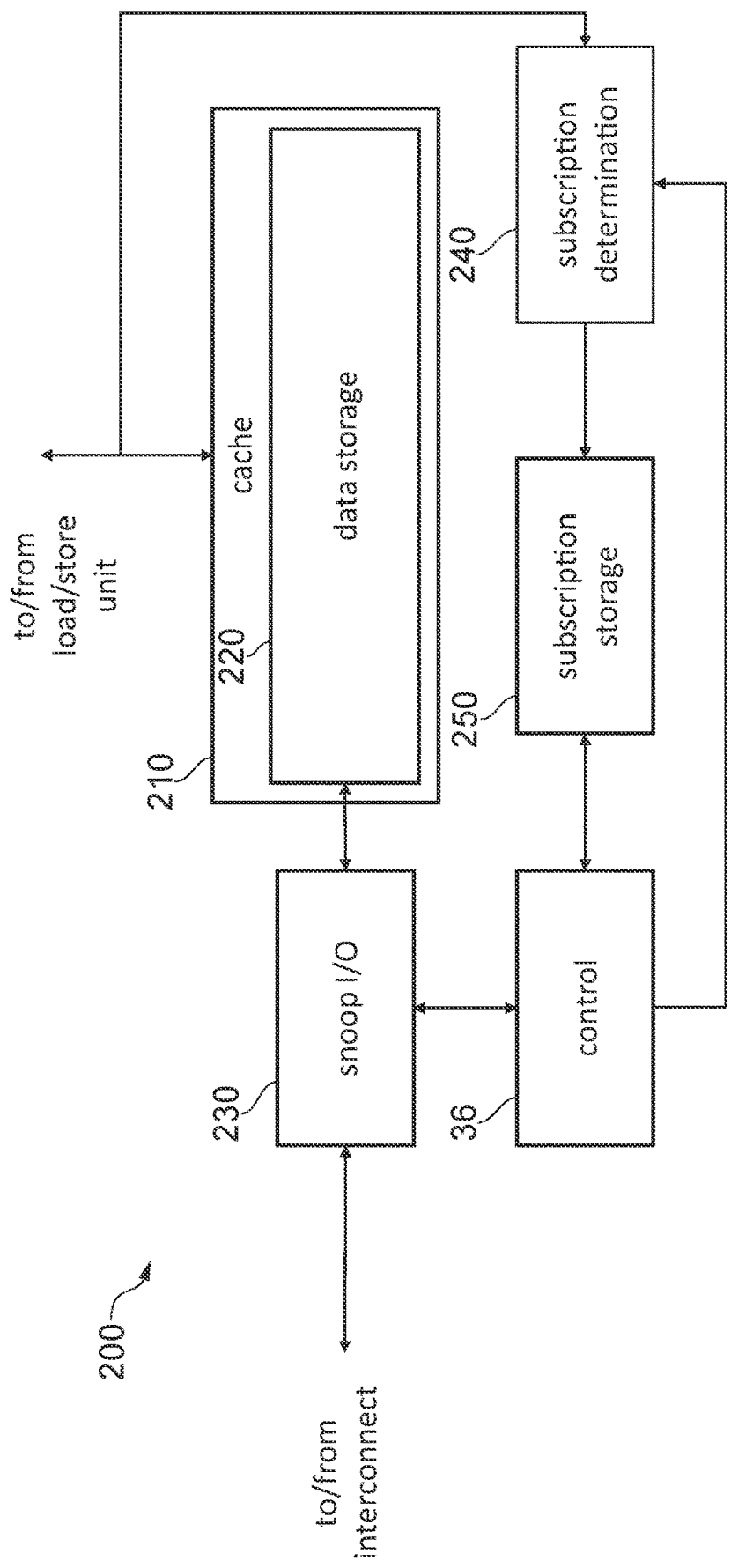
FIG. 2 schematically illustrates more detail of some of the components of the apparatus shown in FIG. 1 according to some example embodiments.

FIG. 2 schematically illustrates an example of an apparatus 200 according to the present techniques, which forms part of the data processing apparatus 2 according to some embodiments. The apparatus 200 comprises a cache 210 containing circuitry for data storage 220. It is to be understood that the cache 210 may be equivalent to any one of the L1 data cache 30, L1 instruction cache 8, and L2 cache 32 illustrated in the data processing apparatus 2. However, for conciseness, only the cache 210 will be referred to for the present example.

The cache 210 interfaces with an interconnect to one or more further system components in a data processing system via snoop input/output (I/O) circuitry 230. The snoop I/O circuitry 230 is capable of receiving and sending snoop requests specifying regions of memory 34 corresponding to cache lines. The target of such snoop requests may relate to a cache line stored in the cache 210 or in a local cache of one of the further system components, and may request that the cache line is transmitted or invalidated. In some examples, the snoop I/O circuitry 230 does not send a snoop request itself, but rather causes a snoop request to be sent on its behalf by the interconnect or a further system component such as a central home node in the interconnect.

Figure 3:
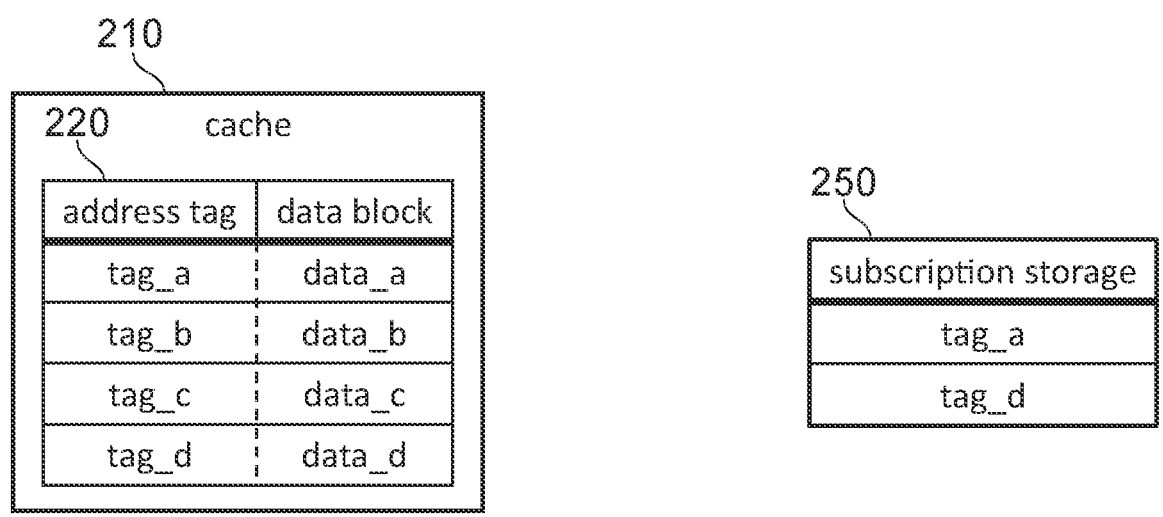
FIG. 3 illustrates a configuration of subscription storage circuitry according to the example embodiment illustrated in FIG. 2.

The apparatus 200 comprises subscription determination circuitry 240 configured to store one or more subscription indicators in subscription storage circuitry 250. The subscription indicators are used to indicate a subscription to a particular region of the memory 34. In this example, the subscription storage circuitry 250 is configured to store the subscription indicators separately from the data storage 220 of the cache 210. FIG. 3 illustrates an example of how the subscription indicators may be represented in such a configuration. The subscription storage circuitry 250 comprises a storage element to store address tags that correspond to address tags in one or more cache lines in the data storage 220 of the cache 210. These subscription indicators indicate that cache lines corresponding to tag_a and tag_d are subscribed cache lines. On the other hand, the cache lines corresponding to tag_b and tag_c are not subscribed cache lines.

Returning to FIG. 2, the apparatus 200 is provided with control circuitry 36 configured to monitor snoop requests received and sent by the snoop I/O circuitry 230. The control circuitry 36 is also capable of causing a snoop request to be sent via the snoop I/O circuitry 230. The control circuitry 36 is further coupled to the subscription determination circuitry 240 and the subscription storage circuitry 250. The control circuitry 36 is responsive to an invalidation request targeting a cache line stored in the cache 210 to determine whether the cache line targeted by the invalidation request is a subscribed cache line. In particular, the control circuitry 36 performs a look up in the subscription storage circuitry 250 to determine whether there is a subscription indicator indicating a subscription to a region of memory 34 corresponding to the cache line targeted by the invalidation request. If such a subscription indicator is stored, the control circuitry 36 determines that the cache line targeted by the invalidation request is a subscribed cache line, and generates a re-fetch request specifying the region of memory 34. In particular, the control circuitry 36 causes the snoop I/O circuitry 230 to send (or cause to be sent) a snoop request to re-fetch the cache line after a delay. A response to the re-fetch request would provide the current version of the cache line, which is then stored in the cache 210.

According to the present techniques, if a subscribed cache line is invalidated, it can be brought back to the cache 210 quickly, so as to reduce the possibility of a cache miss occurring after the invalidation.

Figure 4:
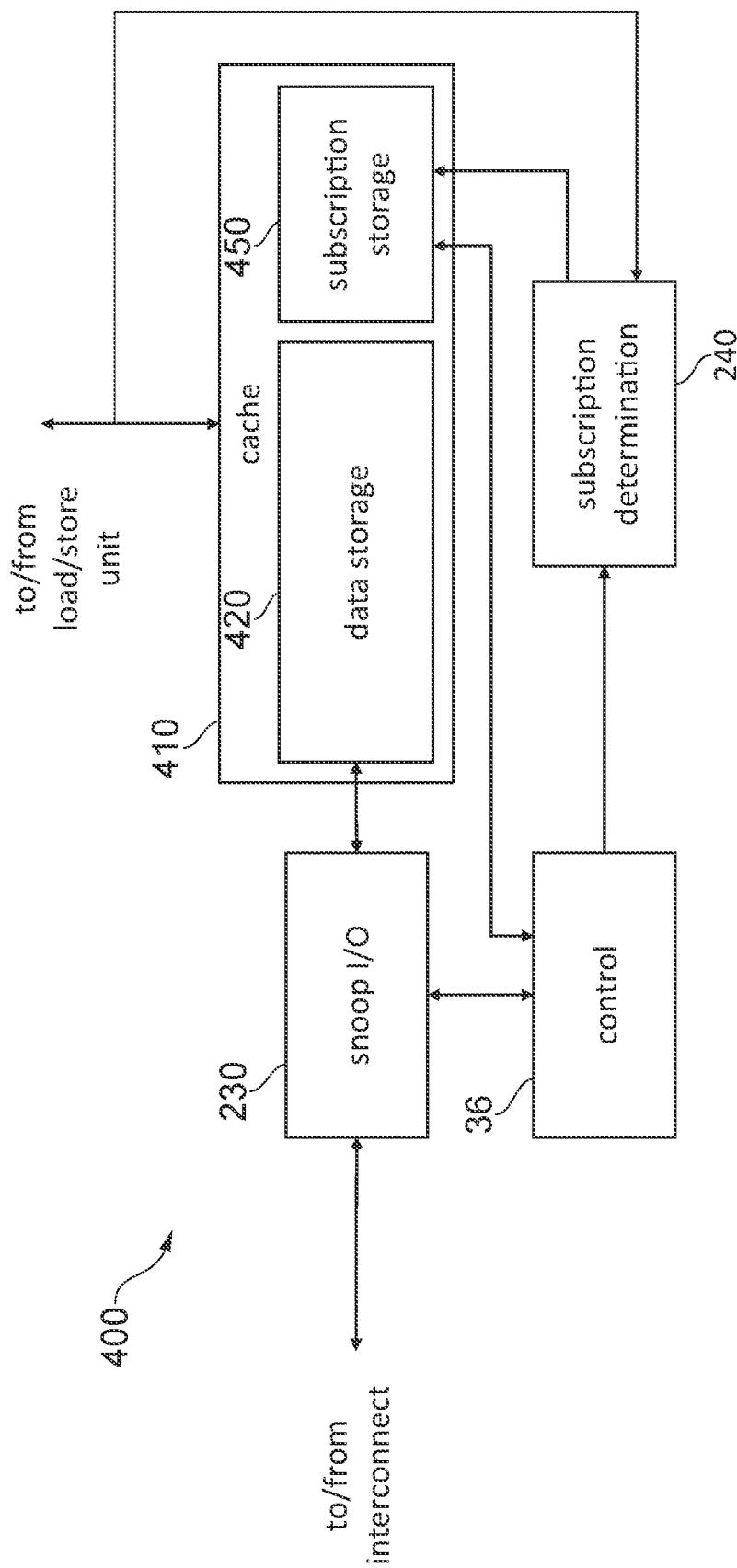
FIG. 4 schematically illustrates more detail of some of the components of the apparatus shown in FIG. 1 according to some example embodiments.

FIG. 4 schematically illustrates an example of an apparatus 400 according to the present techniques, which may be used as an alternative to the apparatus 200. The apparatus 400 comprises snoop I/O circuitry 230 and subscription determination circuitry 240 which may be configured in a similar way to those in the apparatus 200 described above.

Figure 5:
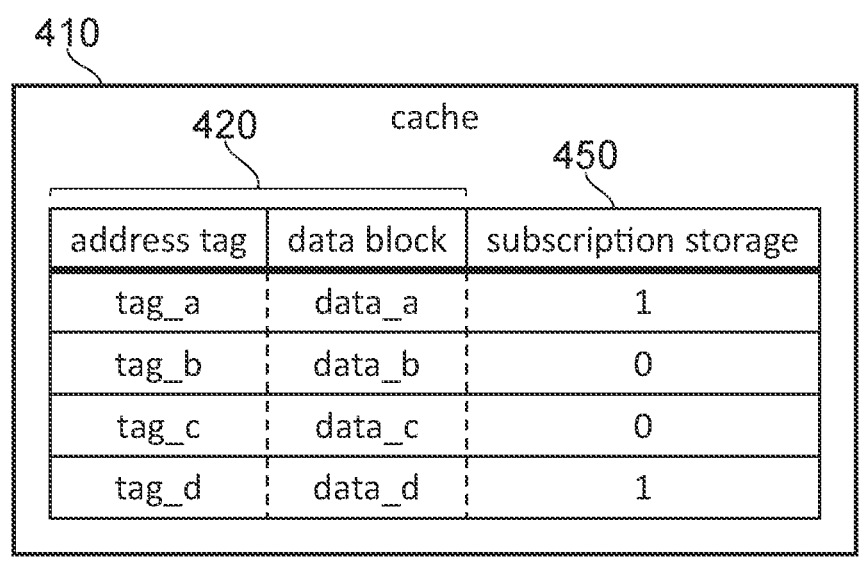
FIG. 5 illustrates a configuration of subscription storage circuitry according to the example embodiment illustrated in FIG. 4.

In the apparatus 400, subscription storage circuitry 450 is arranged to be included in the cache 410. In particular, the cache lines of the cache 410 comprise a field for data storage 420, and a field for the subscription storage 450. Therefore, the cache lines and the subscription indicators are stored in association with each other. This allows for a simplification of the subscription indicator when compared with the example of FIG. 3. FIG. 5 illustrates an example of the subscription storage circuitry 450 being arranged in the cache 450. Each cache line includes a field for storing an indicator comprising a flag (in this example a single bit flag), where the value of the flag indicates whether a corresponding cache line is a subscribed cache line. As shown in FIG. 5, the cache lines corresponding to tag_a and tag_d are indicated as subscribed, since the associated flags are set to a value of 1. On the other hand, tag_b and tag_c are not indicated as subscribed, since the associated flags are set to a value of 0.

When comparing the subscription indicators of FIGS. 3 and 5, implementing the subscription storage circuitry 450 as part of the cache 410 allows for a reduced data size for each subscription indicator. In particular, it is not necessary to include information (such as the address tags of FIG. 3) to associate the subscription indicator with a particular cache line. However, for the data storage 420 to retain the same capacity for data storage as the data storage 220 of FIG. 2, the cache 410 would need to be slightly larger overall to accommodate the subscription indicators.

The apparatus 400 is also provided with control circuitry 36 according to the present techniques. The control circuitry 36 performs the same functionality as described above with reference to FIG. 2, except the control circuitry 36 monitors the contents of the cache 410 in order to determine whether a cache line targeted by an invalidation request is a subscribed cache line. In particular, the control circuitry 36 performs a lookup in the cache 410 to locate the cache line targeted by the invalidation request, and determines whether a subscription indicator indicating a subscription is stored in a corresponding field of the cache line. If the subscription indicator is stored, then the control circuitry 36 generates a re-fetch request after a delay, and interacts with the snoop I/O circuitry 230 to send (or cause to be sent) a snoop request to re-fetch the cache line after a delay. As above, once a response is received with the up-to-date version of the cache line, it can be stored in the cache 410, thus reducing the possibility of a cache miss occurring after the invalidation.

Figure 6:
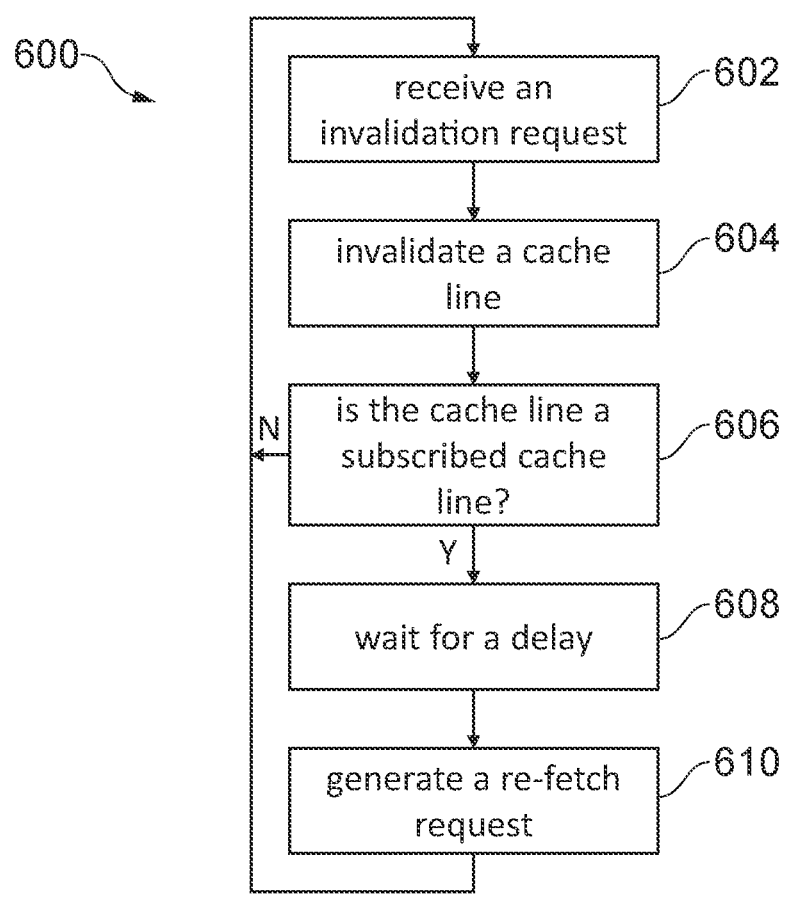
FIG. 6 shows a sequence of steps that are taken according to the method of some embodiments when receiving an invalidation request.

FIG. 6 illustrates a method 600 in accordance with the present techniques. In step 602, an invalidation request is received. For example, the invalidation request may be received as part of a snoop request by snoop I/O circuitry 230. The invalidation request specifies a cache line in a cache 210, 410 to be invalidated. In response to the invalidation request, the specified cache line is invalidated in step 604. In step 606, the control circuitry 36 determines whether the cache line targeted by the invalidation request is a subscribed cache line. The control circuitry 36 performs the determination by searching the subscription storage circuitry 250, 450 for a subscription indicator indicating a subscription to a region of memory 34 corresponding to the invalidated cache line. It will be appreciated that it is not necessary for the control circuitry 36 to perform the determination of step 606 after the invalidation of step 604. In some examples, the control circuitry 36 may perform the determination before or during the actual invalidation of step 604. If the control circuitry 36 determines that the cache line is not a subscribed cache line (i.e. N at step 606), the process returns to monitoring received invalidation requests at step 602. However, if the control circuitry 36 determines that the cache line is a subscribed cache line (i.e. Y at step 606), the control circuitry 36 waits for a delay at step 608, before generating a re-fetch request at step 610. The control circuitry 36 may send the re-fetch request itself, or may control the snoop I/O circuitry 230 to cause the re-fetch request to be sent as a snoop request. After generating the re-fetch request, the previously invalidated cache line is stored in the cache 210, 410 and the process returns to monitoring received invalidation requests at step 602.

Figure 7:
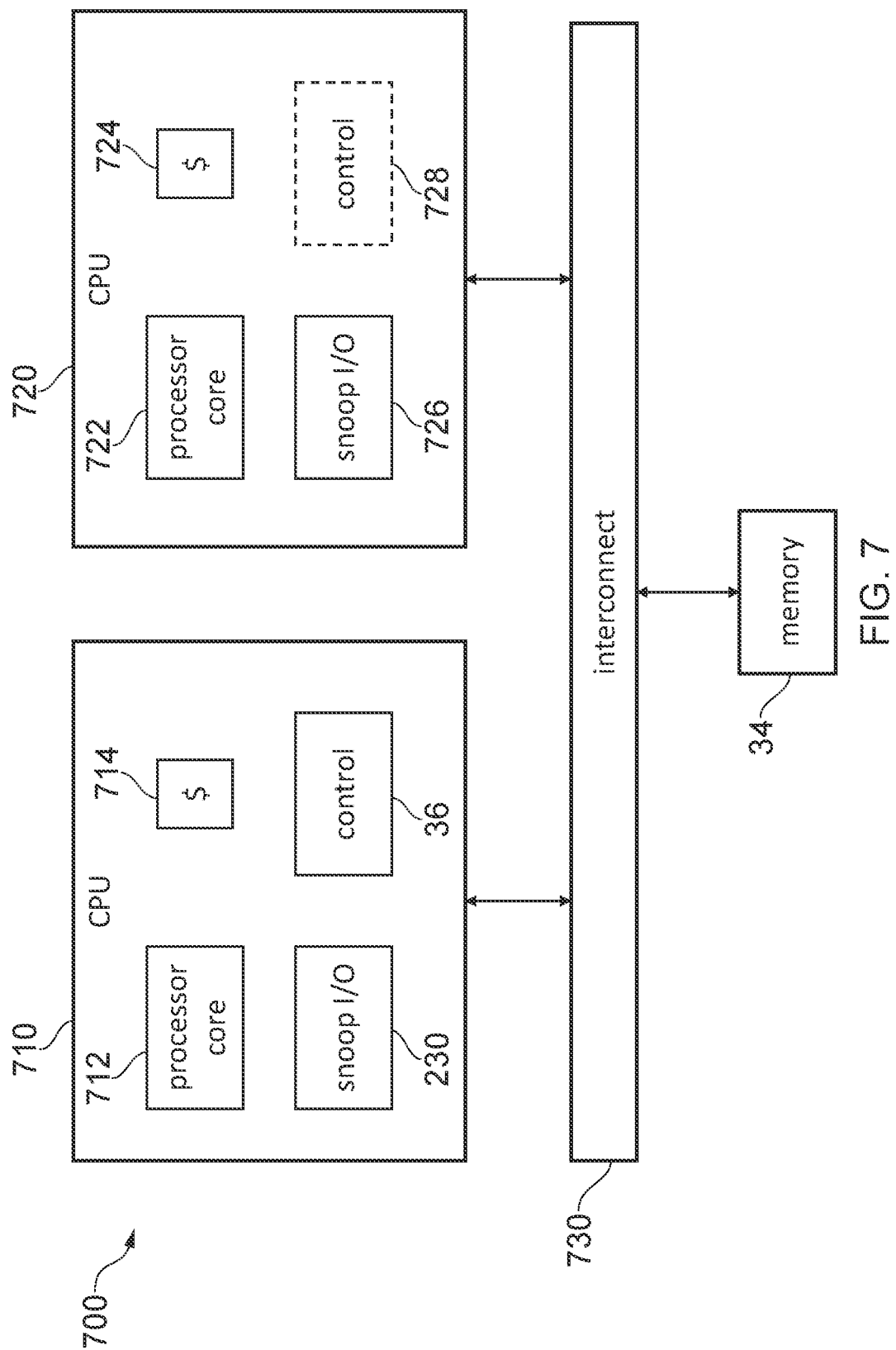
FIG. 7 schematically illustrates a data processing system comprising an apparatus according to some example embodiments.

FIG. 7 schematically illustrates a data processing system 700 incorporating the functionality of the control circuitry 36 as described in previous examples. The data processing system 700 comprises two central processing units (CPUs), however it will be understood that a data processing system may alternatively comprise other processing units such as a graphics processing unit (GPU) or a neural processing unit (NPU) in any combination.

The CPU 710 may correspond to the data processing apparatus 2 of FIG. 1, where for conciseness the various stages of the pipeline 4 are represented generally by the processor core 712. The CPU 710 comprises a cache 714 that may correspond to the cache 210 of the apparatus 200 or the cache 410 of the apparatus 400. The CPU 710 also comprises snoop I/O circuitry 230 and control circuitry 36, each of which may be configured similarly to those of previous examples.

The CPU 720 is a further system component comprising a processor core 722, a cache 724 and snoop I/O circuitry 726, each of which may be equivalent to those in the CPU 710, but operate independently from the CPU 710. The CPU 720 may optionally also contain control circuitry 728 so that the CPU 720 can also support the subscription functionality according to the present techniques.

The CPU 710 and CPU 720 are configured to communicate with each other and the main system memory 34 via an interconnect 730, in order to implement a coherence protocol. In particular, the CPU 710 and CPU 720 may send and receive various signals such as snoop requests using their respective snoop I/O circuitry 230, 726 to maintain data coherence between the cache 714, the cache 724, and the memory 34 in accordance with the coherence protocol. In some examples, the snoop I/O circuitry 230, 726 causes another system component (such as the interconnect 730 or a central home node) to send a snoop request on its behalf.

While executing a program on the data processing system 700, the CPU 720 may encounter an instruction requiring a modification to data, a copy of which is also stored in a cache line stored in the cache 714. According to the coherence protocol, the snoop I/O circuitry 726 of CPU 720 causes a snoop request requesting invalidation of the cache line in the cache 714. The snoop I/O circuitry 230 receives the snoop request from the interconnect 730 and causes the cache 714 to invalidate the cache line, and may send a confirmation in reply to the snoop I/O circuitry 726. The CPU 720 is then able to perform the instruction to modify the data without a risk of generating incoherent data.

In response to the invalidation, the control circuitry 36 determines whether the cache line was a subscribed cache line by looking up the subscription storage circuitry 250, 450 as previously described with reference to FIGS. 2 to 6. If the control circuitry 36 determines that the cache line was a subscribed cache line, the control circuitry 36 waits for a delay to allow the CPU 720 to perform the instruction to modify the data, before causing the snoop I/O circuitry 230 to send a re-fetch request to the CPU 720 via the interconnect 730. On receipt of the re-fetch request, the snoop I/O circuitry 726 causes the cache line to be transmitted via the interconnect 730 to the CPU 710, where the cache line is stored in the cache 714. Therefore, the amount of time where the subscribed cache line is not present in the cache 714 is reduced, thereby reducing the possibility of a cache miss occurring in the CPU 710.

The following is a description of specific examples of how to subscribe to a cache line, or in particular, how a subscription indicator indicating a subscription to a region of memory 34 is caused to be stored in the subscription storage circuitry 250, 450. Specifically, two possible implementations will be described.

In some examples, such as the example illustrated in FIG. 1, an instruction-based implementation may be used. In particular, the decode stage 10 is configured to support a subscription instruction indicating a region of memory 34. This region of memory 34 may be known to a programmer or determined by a compiler, such that a dedicated instruction to subscribe to that region of memory 34 can be added to the program. In response to the subscription instruction, the decode stage 10 is configured to generate control signals to cause a subscription indicator to be stored, thus indicating a subscription to that region of memory 34. For example, the decode stage 10 is configured to control the load/store unit 28 to store the subscription indicator in the subscription storage circuitry 250, 450. The subscription instruction may indicate the region of memory 34 using an absolute address, a relative address, or using an offset value from a base address stored in a register. The particular format of how the address is indicated in the subscribe instruction may be the same as a format used by load or store instructions that are also supported by the decode stage 10. It will be appreciated, however, that the address indication that is associated with the subscription indicator in the subscription storage circuitry 250 may be in any format, and does not need to be in the same format specified by the subscription instruction. In some examples, the address indication may be translated between a virtual address, an intermediate address or a physical address. In other examples, the address indication is the same tag that is used to identify cache lines in the cache 210, 410, which in turn depends on the particular micro-architecture of the memory system.

Accordingly, one possible syntax of the subscription instruction could be "SUBSCRIBE <addr>", where SUBSCRIBE corresponds to a unique opcode of the subscription instruction, and addr represents the absolute or relative address of the region of memory 34. Another possible syntax could be "SUBSCRIBE <Rb><offset>", where SUBSCRIBE similarly corresponds to a unique opcode of the subscription instruction, and Rb identifies a register holding a base address, and offset defines an offset value from that base address.

A subscription instruction may be re-purposed as a prefetch instruction, and likewise, a prefetch instruction may be re-purposed as a subscription instruction. For example, if a subscription instruction is received, and a cache line corresponding to the region of memory 34 is not currently stored in the cache, the control circuitry 36 can be configured to further generate a fetch request specifying the cache line. This allows the subscription instruction to emulate a prefetch instruction. Alternatively, if a prefetch instruction is received, the decode stage 10 can cause a subscription indicator to be stored indicating a subscription to the region of memory specified by the prefetch instruction. In such examples, the additional functionality of the subscription instruction can be provided to a programmer or compiler, without requiring an additional instruction encoding.

Figure 8:
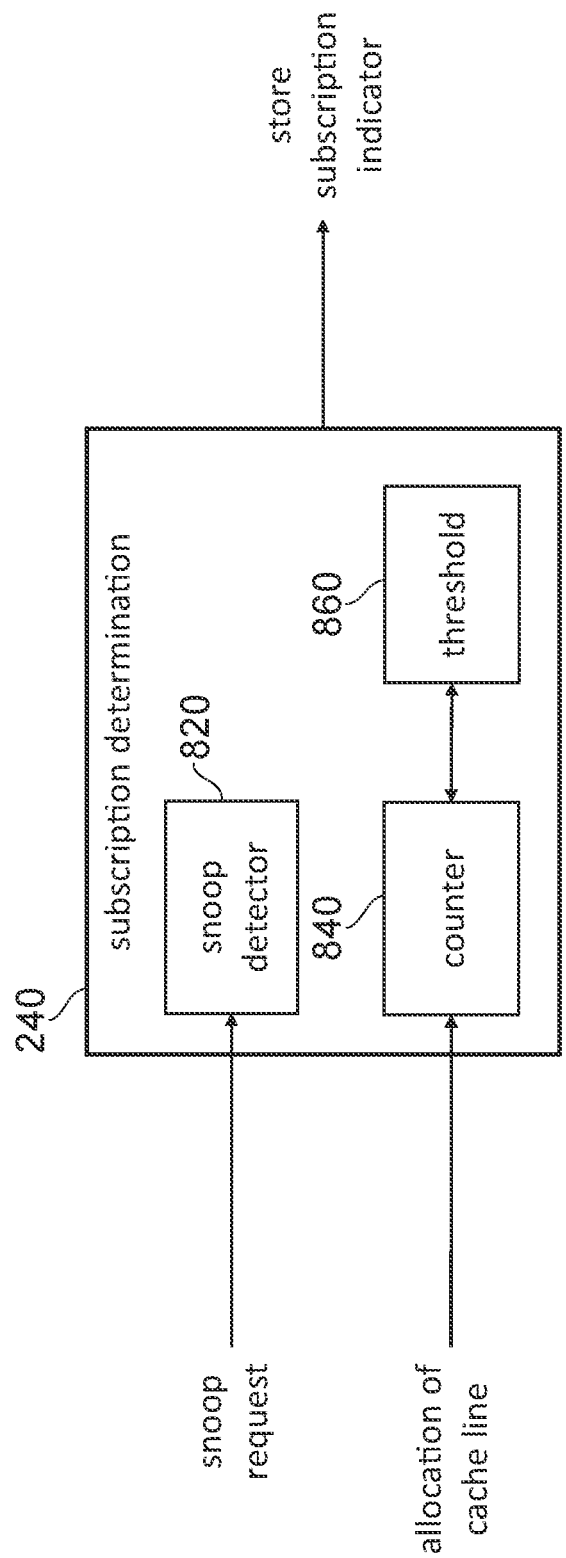
FIG. 8 schematically illustrates an example of subscription determination circuitry in accordance with some embodiments.

In some examples, a detection-based implementation may be used. In particular, hardware is implemented to determine whether to subscribe to a cache line based on certain predefined conditions. FIG. 8 schematically illustrates an example of the subscription determination circuitry 240 as provided in previous examples. The subscription determination circuitry 240 comprises a snoop detector 820 configured to receive a snoop request indication from the snoop I/O circuitry 230. The snoop request indication may be received directly from the snoop I/O circuitry 230, or indirectly via the control circuitry 36. The snoop detector 820 monitors the snoop request indications, and is responsive to a snoop request indicating an intent to modify data held in a cache line of the cache 210, 410. In response to such a snoop request, the subscription determination circuitry 240 is configured to generate a subscription indicator to indicate a subscription to the region of memory 34 that is intended to be modified, and stores the subscription indicator to the subscription storage circuitry 250, 450.

The subscription determination circuitry 240 is further provided with a counter 840, the value of which is compared against a threshold 860. The threshold 860 may be stored in a register within the subscription determination circuitry 240. The subscription determination circuitry 240 is configured to monitor occurrences of cache lines being allocated to the cache 210, 410 and to count a number of times that a particular cache line is allocated to the cache 210, 410 within a monitoring period. For example, the counter 840 may be incremented or decremented each time the cache line is allocated to the cache 210, 410. The monitoring period may be defined in various ways, including a number of clock cycles or a number of instructions executed by execute stage 16. When the monitoring period ends, the counter 840 may be reset to an initial value in order to restart counting for the next monitoring period.

If the value of the counter 840 reaches the threshold 860 within the monitoring period, it can be inferred that the cache line is frequently important to the program being executed. Furthermore, it is likely that a cache miss is occurring before each allocation, causing a loss of performance due to the additional latency of looking up other levels of a cache hierarchy or main memory 34. Therefore, in such circumstance it may be concluded that a subscription would be beneficial to the performance of the program. As such, when the value of the counter 840 reaches the threshold 860, the subscription determination circuitry 240 is configured to generate a subscription indicator to indicate a subscription to the region of memory 34 corresponding to the cache line, and stores the subscription indicator in the subscription storage circuitry 250, 450.

The example of FIG. 8 is just one example of the subscription determination circuitry 240, and other configurations may be used instead. For example, the subscription determination circuitry 240 may only be responsive to either one of the two inputs shown in FIG. 8 instead of both. Furthermore, it will be appreciated that in the example of FIG. 8, only one counter 840 is provided for simplicity of explanation, and so the allocation of only one cache line is monitored and counted at a time. However, the subscription determination circuitry may instead comprise a plurality of counters, where each counter is responsive to one of a plurality of monitored cache lines being allocated to the cache 210, 410. In response to any one of the plurality of counters reaching the threshold 860, the subscription determination circuitry 240 generates a subscription indicator to indicate a subscription to a region of memory 34 corresponding to the cache line whose allocations to the cache 210, 410 are counted by that counter. The subscription indicator is then stored in the subscription storage circuitry 250, 450.

It is to be understood that the present techniques are not limited to using both the instruction-based and the detection-based implementations as described above. In some examples, only the instruction-based implementation is used, whereas in other examples, only the detection-based implementation is used.

Figure 9:
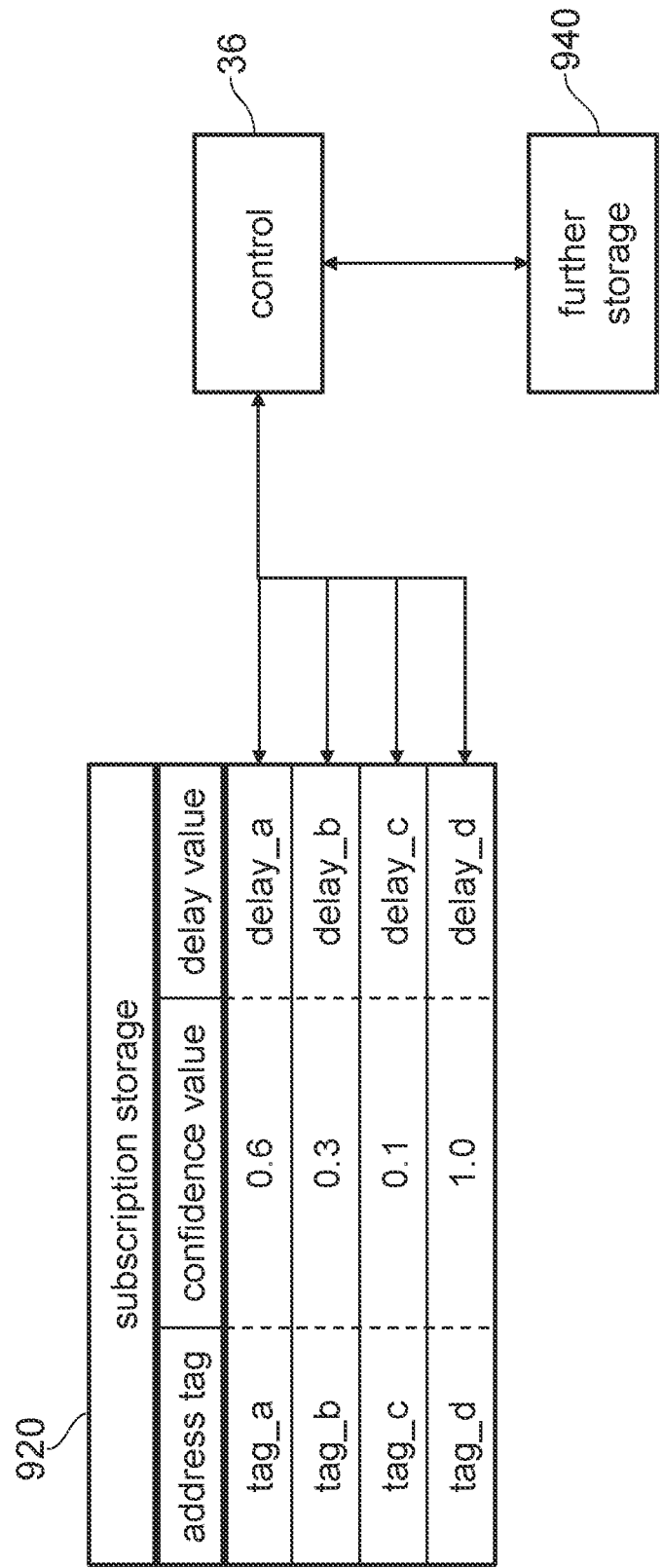
FIG. 9 illustrates a configuration of subscription storage circuitry according to some example embodiments.

It is possible for the subscription indicator to include information in addition to simply indicating whether a subscription to a region of memory 34 exists or not. Such additional information can be used to influence the specific behaviour of the present techniques. FIG. 9 illustrates an example of subscription storage circuitry 920, where each subscription indicator entry comprises three fields. In a first field, the subscription indicator contains an address tag to indicate the region of memory 34 that has been subscribed to. It is to be understood however, that as with FIG. 5, the address tag may be redundant if the subscription storage circuitry 920 is arranged as part of the cache 410 similarly to the apparatus 400 of FIG. 4, in which case the address tag does not need to be specified by the subscription indicator.

In a second field, the subscription indicator contains a confidence value field to indicate a relative confidence or importance of each subscription. In particular, a subscription to some regions of memory 34 may be more important than for other regions of memory 34 for a current part of a program. The confidence value is used to indicate whether the subscription is to be treated as indicated depending on a confidence threshold. For example, a confidence value may be any number between 0.0 and 1.0, where subscription indicators with a confidence value exceeding a confidence threshold of 0.5 are treated as indicated. On the other hand, subscription indicators with a confidence value below the confidence threshold are treated as not indicated. Therefore, in the example of FIG. 9, cache lines associated with tag_a and tag_d would be treated as subscribed since the confidence values (0.6 and 1.0) both exceed the confidence threshold of 0.5. As such, an invalidation of those cache lines in response to a snoop request would cause the control circuitry 36 to generate a re-fetch request as described in previous examples. On the other hand, cache lines associated with tag_b and tag_c would not be treated as subscribed since the confidence values (0.3 and 0.1) are both below the confidence threshold. As such, an invalidation of those cache lines would not cause the control circuitry 36 to generate a re-fetch request.

The control circuitry 36 is capable of adjusting the confidence value of each entry in the subscription storage circuitry 920 in response to certain conditions. In particular, conditions that further indicate that a subscribed cache line is still important will cause an increase in confidence, whereas conditions that suggest that the subscribed cache line is no longer needed will cause a decrease in confidence. In some examples, a cache line being stored in the cache 210, 410 in response to a data processing instruction (e.g. a load instruction or the subscription instruction described previously) would indicate that the data in the cache line will be used by the execute stage 16 in the near future. Therefore, the control circuitry 36 increases the confidence value of the cache line. In some examples, the control circuitry 36 increases the confidence to a maximum value (such as 1.0 in the present example) in response to a subscription instruction. In other examples, a subscription instruction may specify a confidence value as an operand. In still other examples, where the functionality of a subscription instruction is included in a prefetch instruction as described previously, a resulting subscription indicator may be initialised with a relatively low confidence value.

In other examples, a snoop request being received by the snoop I/O circuitry 230 specifying a subscribed cache line indicates that the subscribed cache line is important for multiple data processing apparatuses. For example, in context of the data processing system 700, a snoop request would be received by the CPU 710 each time a cache line in the cache 714 is invalidated by the CPU 720 as described in previous examples. As such, the snoop request indicates that the subscribed cache line is important for data processing in both the CPU 710 and CPU 720, and therefore could frequently be targeted by a snoop request in the future. In accordance with the present techniques, maintaining a subscription to that cache line would be advantageous to reduce the possibility of cache misses. Therefore, the control circuitry 36 increases the confidence value of the subscribed cache line in response to receiving a snoop request specifying the subscribed cache line.

In other examples, conditions indicating that the subscribed cache line is no longer needed includes the occurrence of an exception. Exceptions cause a break in ordinary program flow in response to, for example, a hardware interrupt or intervention by a supervisory process such as an operating system or hypervisor. In response to the exception, instructions from an exception handling routine are executed instead of the program instructions. An exception handling routine will likely need to access memory, and so will make use of the cache 210, 410 while it is running. However, since the exception handling routine is unlikely to use data in the subscribed cache lines, maintaining the subscribed cache lines does not provide any benefit, and may limit the number of usable cache lines for the exception handling routine. Therefore, the control circuitry 36 decreases the confidence value of the subscription indicators corresponding to the subscribed cache lines in response to the exception. In some examples, the control circuitry 36 decreases the confidence value below the confidence threshold in response to an exception. This would cause the subscription to be treated as no longer indicated, thus effectively cancelling the subscription.

In examples where the subscription storage circuitry 920 is arranged as part of the cache 410, a confidence value field may be implemented for all cache lines (instead of the single bit flag shown in FIG. 5). In such examples, the confidence values may be some initial value below the confidence threshold when each cache line is allocated to the cache 410. The control circuitry 36 then controls the confidence value over time such that some subscriptions start being treated as indicated while others are treated as not indicated.

In a third field of the subscription storage circuitry 920, the subscription indicator contains a delay value to indicate the delay needed before the control circuitry 36 generates a re-fetch request as described in previous examples. In some examples, the delay value is indicated as a number of clock cycles or a number of instructions executed by the execute stage 16. In some examples, the delay value takes a default initial value defined in hardware or in a programmable register. In other examples, a subscription instruction may specify a delay value as an input operand.

As described with reference to FIG. 7, an invalidation request is likely to be received when a cache line is being modified by the CPU 720, and the delay is necessary to allow the CPU 720 to perform that modification before the cache line is re-fetched. If the delay is too short, then the cache line will be re-fetched before the modification has completed, and if the delay is too long, the time where a cache miss could occur is extended.

The control circuitry 36 is capable of adjusting the delay value of each entry of the subscription storage circuitry 920 in response to conditions indicating that the delay is too long or too short. In some examples, where the delay is too short and the cache line is re-fetched before the CPU 720 can perform a modification, the CPU 720 may re-invalidate the cache line quickly after the re-fetch. If the control circuitry 36 generates another re-fetch request after the same delay, there is a risk that the CPU 720 would still not be given enough time to modify the cache line. If so, then an endless loop of re-invalidation and re-fetching could happen, effectively stalling the CPU 720. This may be detected and prevented by the control circuitry 36 in a number of ways as follows.

Figure 10:
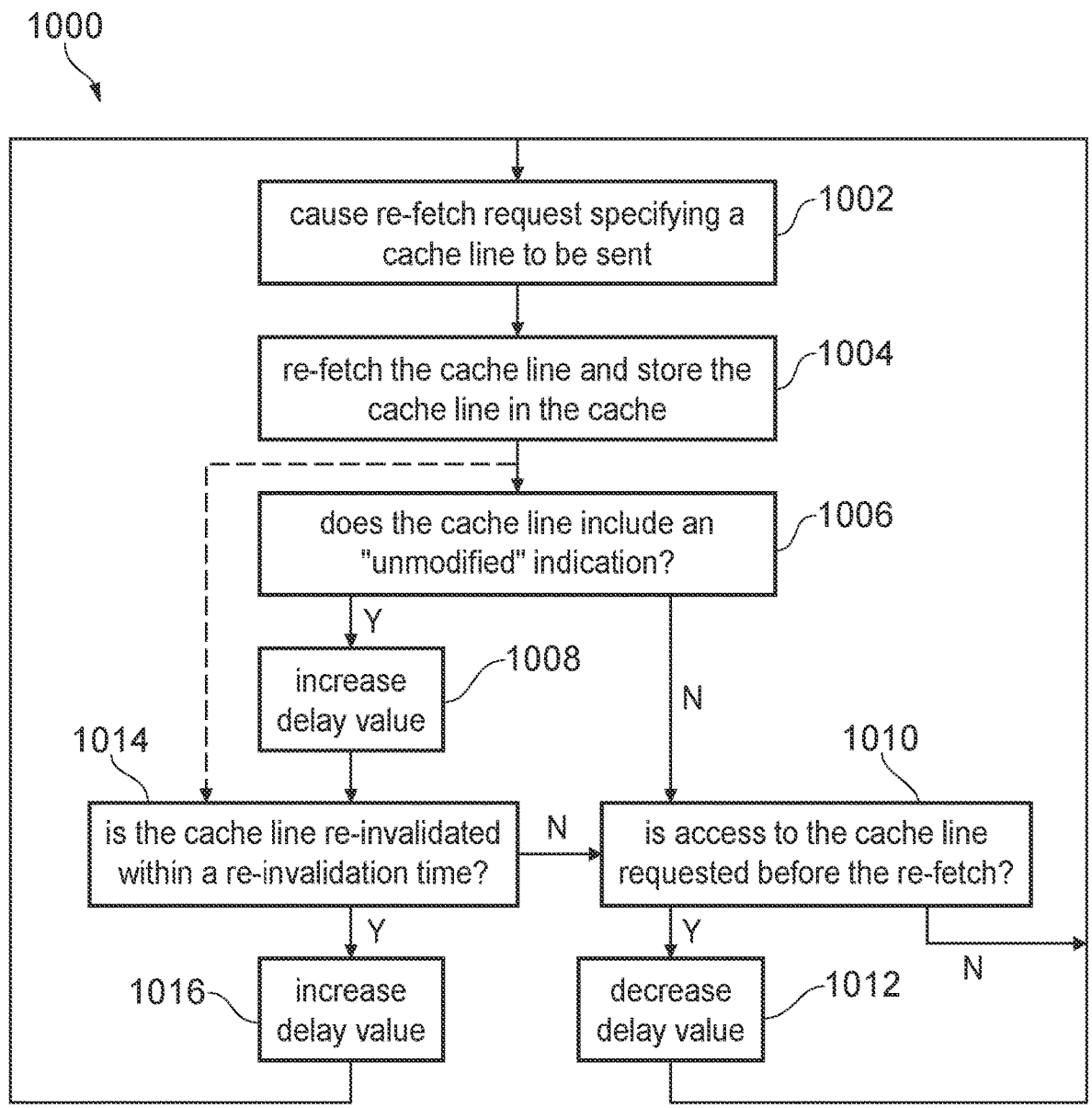
FIG. 10 shows a sequence of steps that are taken to adjust a delay value according to some example embodiments.

FIG. 10 illustrates a method 1000 performed by the control circuitry 36 to adjust the delay value stored in subscription storage circuitry 920. At step 1002, the control circuitry 36 causes a re-fetch request specifying a subscribed cache line to be sent, as described in previous examples. At step 1004, the subscribed cache line is retrieved and stored in the cache 210, 410.

At step 1006, the control circuitry 36 checks whether the cache line includes an indication that it has been modified. This indication may be one or more status bits included in a field of the cache line, where the value of the status bit indicates whether the cache line has been modified since the invalidation. In some examples where the subscribed cache line was known to be identical to the corresponding data in memory 34, a coherence status could be used as the indication. In particular, if the subscribed cache line was marked as 'unmodified' or 'clean' (i.e. identical to memory 34) when the invalidation occurred, but then marked as 'modified' or 'dirty' (i.e. different to memory 34) when the subscribed cache line is re-fetched, then the control circuitry 36 determines that the CPU 720 modified the subscribed cache line before the re-fetch request was generated in the CPU 710. In other examples, it is recognised that the coherence status of the subscribed cache line could already be 'modified' due to a previous modification by any previous owner (i.e. not necessarily because of a modification by CPU 720). Therefore, one or more status bits are provided in order to indicate whether the subscribed cache line had been modified by the immediately preceding owner. In such examples, once the CPU 710 re-fetches the subscribed cache line and the status bits indicates that the subscribed cache line had been modified by the immediately preceding owner, it can be determined that the CPU 720 had modified the subscribed cache line.

If at step 1006, the cache line does include an 'unmodified' indication, then it can be inferred that the delay was not sufficient for the CPU 720 to modify the subscribed cache line before the re-fetch. Therefore, at step 1008, the control circuitry 36 increases the delay value. On the other hand, if the cache line does not include an 'unmodified' indication, then the delay was sufficient for the CPU 720 to modify the cache line. Hence, it is possible to decrease the delay value to reduce the probability of a cache miss occurring. To determine whether this is necessary, at step 1010 it is determined whether access to the subscribed cache line was requested before the re-fetch had been generated. If so, then a cache miss had occurred, and the delay value is decreased at step 1012. If not, then a cache miss had not occurred, and decreasing the delay value is not necessary.

At step 1014, the control circuitry 36 determines whether the subscribed cache line is re-invalidated within a re-invalidation time. The re-invalidation time may be a predetermined time set by hardware, or may be programmable. If the subscribed cache line is re-invalidated, it can be inferred that the delay was not sufficient for the CPU 720 to modify the subscribed cache line before the re-fetch request, and so the CPU 720 is attempting to modify the subscribed cache line again. Therefore, rather than simply re-fetching the subscribed cache line after the same delay, the control circuitry 36 increases the delay value in response to the re-invalidation at step 1016, such that the next re-fetch request is generated after the new delay. On the other hand, if a re-invalidation does not occur, then it can be inferred that the delay was sufficient for the further data processing apparatus to modify the subscribed cache line, and as above, the delay value could be decreased to reduce the probability of a cache miss occurring. Therefore, if at step 1014, there is not a re-invalidation within the re-invalidation time, the method moves on to step 1010 as described above.

It will be appreciated that it is not necessary for the control circuitry 36 to detect both conditions in steps 1006 and 1014. In some examples, steps 1006 and 1008 may be omitted such that the control circuitry 36 is only responsive to the re-invalidation at step 1014 (i.e. the method flow takes the dotted line after step 1004). In other examples, steps 1014, and 1016 may be omitted such that the control circuitry 36 is only responsive to the 'unmodified' indication of the subscribed cache line.

Returning to FIG. 9, the delay value fields may be unique to each subscription indicator. For example, where a data processing system such as in FIG. 7 includes yet another CPU (not illustrated), it is possible for invalidation requests to be received from different CPUs. Since those CPUs may have different performance capabilities, the necessary delay before re-fetching some subscribed cache lines may be longer than for other subscribed cache lines. In particular, a subscribed cache line that is often invalidated by a slower CPU will require a longer delay to allow time for modification, than for a subscribed cache line that is often invalidated by a faster CPU. By adjusting the various delay values accordingly, the control circuitry 36 can generate re-fetch requests after an appropriate delay depending on the subscription indicator.

Although FIG. 9 illustrates subscription storage circuitry 920 having all three fields, this is just one example. It is to be understood that it is not necessary always to have all three fields shown in the subscription storage circuitry 920. In some examples, the subscription storage circuitry 920 will include only the address tag and the delay value fields, whereas other examples will include only the address tag and the confidence value fields. In some examples, where the subscription storage circuitry 920 is arranged as part of the cache 410 (such as in FIGS. 4 and 5), the address tag field is not necessary. In such examples, the confidence value and/or the delay value may be stored in respective fields of each cache line to indicate the subscription.

With the functionality described above, it is possible for the control circuitry 36 to dynamically adjust the confidence values and/or delay values of each entry such that they have more appropriate values for the current state of the program. However, after a period of time, the state of the program may change such that a subscribed cache line is less useful, and thus the subscription becomes less beneficial. The control circuitry 36 is capable of cancelling a subscription indicator in response to events that indicate that the subscription is not useful.

In some examples, where the subscription storage 250 is arranged in a storage element separately from the cache 210 (see FIG. 3), it is possible for the subscription storage 250 to not have sufficient capacity for a new subscription indicator to be stored in addition to an existing subscription indicator. The new subscription indicator may be generated in response to a subscription instruction or a determination by the subscription determination circuitry 240. In such examples, the control circuitry 36 can be arranged to cancel a subscription by removing the existing subscription indicator to make room for the new subscription indicator. In examples where the subscription storage 250 contains a plurality of subscription indicators, one subscription indicator can be selected for removal based on an eviction policy such as Least Recently Used (LRU), Least Frequently Used (LFU), or First In First Out (FIFO). After removing the existing subscription indicator, there will be sufficient capacity to store the new subscription indicator.

In some examples, the cache 210, 410 may be managed according to an eviction policy such as LRU, LFU or FIFO, to evict cache lines when new cache lines are being allocated to the cache 210, 410. If a subscribed cache line is removed based on the eviction policy, it can be inferred that the subscription is less useful than it used to be. The control circuitry 36 is responsive to a subscribed cache line being evicted from the cache 210, 410, and cancels a corresponding subscription indicator. In some examples, the cache 210, 410 is configured to prioritise evicting non-subscribed cache lines over subscribed cache lines, which will maintain the subscriptions, but may prioritise the eviction of more useful data instead.

In the examples of FIG. 9, if a subscription were cancelled in the subscription storage circuitry 920, it may be advantageous to retain an adjusted confidence value and/or adjusted delay value in case there is a re-subscription to the same region of memory 34 in the near future. Therefore, in response to a subscription being cancelled, the control circuitry 36 causes the subscription indicator (including the confidence value and/or delay value) to be moved to further storage circuitry 940, such as a region of the main system memory 34. If there is a subsequent re-subscription to the region of memory 34, the control circuitry 36 can then move the subscription indicator back from the further storage circuitry 940 to the subscription storage circuitry 920. As such, the confidence value and/or delay value are already adjusted appropriately, rather than starting at default initial values.

Figure 11:
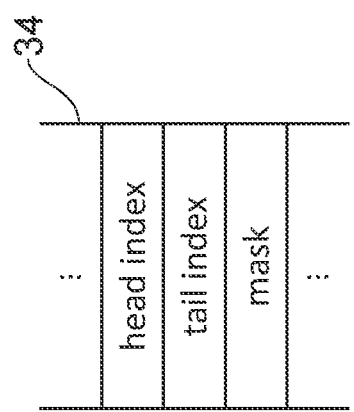
FIG. 11 schematically illustrates a ring buffer to be used by a data processing system according to some example embodiments.
Figure 11:
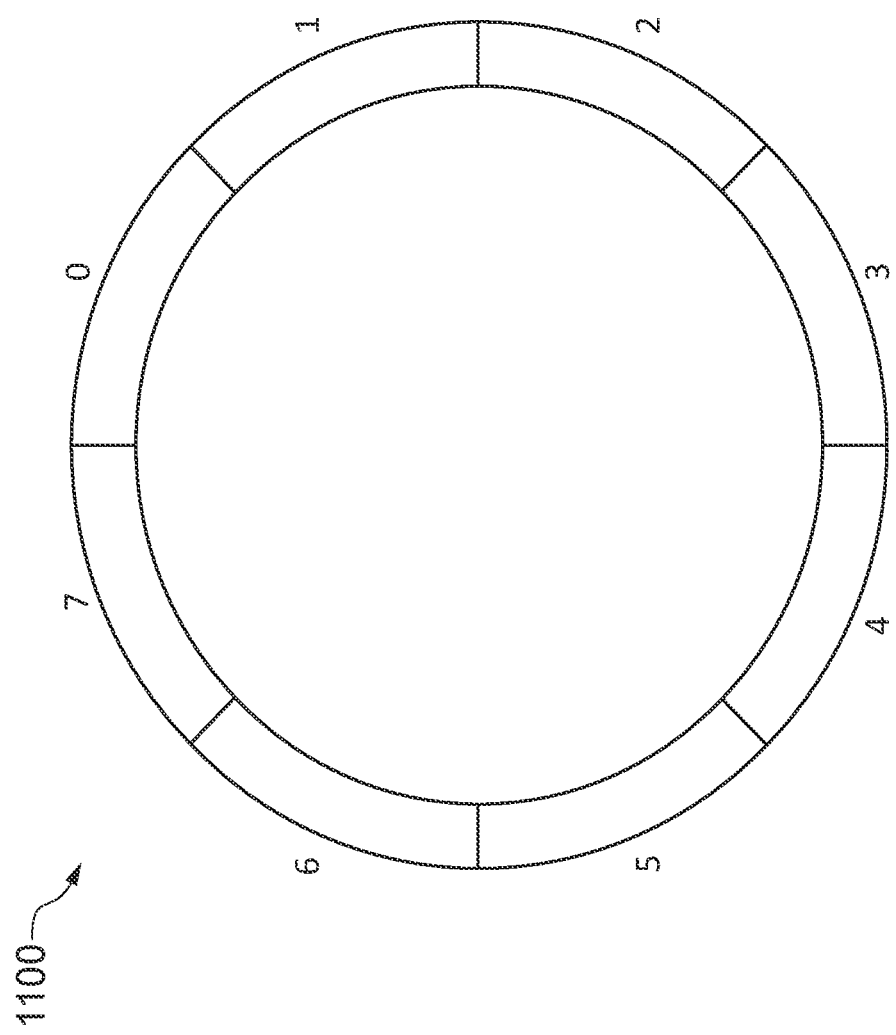

The following is an example of a specific use-case of the present techniques in the context of a ring buffer in memory, access to which is shared by two data processing apparatuses. The ring buffer is provided as a set of memory addresses accessed in sequence, wherein a next memory address pointed to after the last memory address in the set is the first memory address in the set, thus providing a circular sequence. FIG. 11 schematically illustrates an example ring buffer 1100 as a data structure with 8 elements, where this number of elements is merely for clarity of illustration here and it will be appreciated that a ring buffer may commonly have a much larger number of elements. In practice, the ring buffer 1100 may be provided by a contiguous block of memory 34 or a non-contiguous block of memory 34—all that matters is that the ordering of buffer elements is fixed and known. The ring buffer 1100 is accessed by a data processing system such as the data processing system 700 of FIG. 7, wherein one of the CPU 710 and CPU 720 acts as a 'producer', and the other acts as a 'consumer'. The producer in such a data processing system is configured to perform data processing, the results of which are 'consumed' by the consumer. The shared access to the ring buffer 1100 allows for a coordinated processing of data by the producer and the consumer.

The producer is configured to write data to an element of the ring buffer 1100 identified by the write or 'tail' index. The tail index comprises a value stored in memory 34, indicating the index of an element of the ring buffer 1100. Each time the producer writes data to the ring buffer 1100, the tail is incremented so as to identify the next element in the ring buffer 1100. Conversely, the consumer is configured to read data from an element of the ring buffer 1100 identified by the read or 'head' index. The head index also comprises a value stored in memory 34, indicating the index of an element of the ring buffer 1100. Each time the consumer reads data from the ring buffer 1100, the head is incremented so as to identify the next element in the ring buffer 1100.

In ring buffers with a power-of-two number of elements such as the ring buffer 1100, a mask with a value of the number of elements minus one may be bitwise-ANDed with the head or tail indices in order to determine the actual index for the buffer. This constrains the head and tail indices to identify an index that is within the range of the buffer (e.g. for head=10, the resulting index=(mask & head)=2).

During operation, both the producer and the consumer will need to repeatedly perform memory accesses to access the head and tail indices and the mask. However, when the head index is incremented by the consumer, a copy of the old head index in a local cache of the producer would be invalidated, resulting in a cache miss. Similarly, when the tail index is incremented by the producer, a copy of the old tail index in a local cache of the consumer would be invalidated, resulting in a cache miss.

The following example pseudocode indicates the points at which a cache miss is likely to occur in the local cache of the producer while writing data to the ring buffer 1100:

```
//Producer writes element at Tail of ring buffer
Load Tail
Load-acquire Head
//Head likely to have been invalidated, causing a cache miss
//Compare Head and Tail to check for space
CMP
//Branch if no space
Bcc
//Write element to ring slot indicated by Tail
Update Ring[tail & Mask]
//Likely cache miss, but store won't cause a stall
//Increment Tail
ADD
//Write back new Tail
Store-release Tail //Synchronize with load-acquire in consumer
```

The following example pseudocode indicates the points at which a cache miss is likely to occur in the local cache of the consumer while reading data from the ring buffer 1100:

```
//Consumer reads element from Head of ring buffer
Load Head
Load-acquire Tail
//Tail likely to have been invalidated, causing a cache miss
//Compare head and tail to check for used elements
CMP
//Branch if no elements
Bcc
//Read element from ring slot indicated by Head
Read Ring[head & Mask]
//Ring likely to have been invalidated, causing a cache miss
//Increment Head
ADD
//Write back new Head
Store-release Head //Synchronize with load-acquire in producer
```

The above is then to be compared with a reduced possibility of cache misses in a scenario in which one or both of the consumer and producer are provided with control circuitry 36 and subscription storage circuitry 250, 450 in accordance with the present techniques.

Accordingly, the producer executes a "subscribe" instruction indicating the region of memory 34 containing the head index. The control circuitry 36 of the producer will then generate a re-fetch request specifying the head index in response to an invalidation, thus causing the updated head index to be stored back in the local cache of the producer. In accordance with previous examples, this reduces the possibility of a cache miss when the producer needs to access the head index. The following example pseudocode indicates where the possibility of a cache miss is reduced in the producer:

```
//Producer writes element at tail of ring buffer
SUBSCRIBE Head
//Perform other data processing
...
Load Tail
Load-acquire Head
//Lower risk of cache miss due to re-fetch after invalidation
//Compare Head and Tail to check for space
CMP
//Branch if no space
Bcc
//Write element to ring slot indicated by Tail
Update Ring[Tail & Mask]
//Likely cache miss, but store won't cause a stall
//Increment Tail
ADD
//Write back new Tail
Store-release Tail //Synchronize with load-acquire in consumer
```

Similarly, the consumer executes two subscribe instructions; one to indicate the region of memory 34 containing the tail index, and the other to indicate the region of memory 34 containing the ring buffer 1100 itself. The control circuitry 36 of the consumer will then generate re-fetch requests specifying the tail index and the ring buffer 1100 in response to invalidations, thus causing the updated tail index and newly buffered data to be propagated back to the local cache of the consumer. In accordance with previous examples, this reduces the possibility of a cache miss when the consumer needs to access the tail index and the data of the ring buffer 1100. The following example pseudocode indicates where the possibility of a cache miss is reduced in the consumer:

```
//Consumer reads element from head of ring buffer
SUBSCRIBE Tail
SUBSCRIBE Ring[Head & Mask]
//Perform other data processing
...
//Attempt to read element
Load Head
Load-acquire Tail
//Lower risk of cache miss due to re-fetch after invalidation
```

```
//Compare Head and Tail to check for used elements
CMP
//Branch if no elements
Bcc
//Read element from ring slot indicated by Head
Read Ring[head & Mask]
//Lower risk of cache miss due to re-fetch after invalidation
//Increment Head
ADD
//Write back new Head
Store-release Head //Synchronize with load-acquire in producer
SUBSCRIBE Tail
SUBSCRIBE Ring[Head & Mask]
//Re-subscribe to ring slot indicated by new Head
```

In the above example, the reduced risk of cache misses results in reduced average latency in memory accesses in the producer and the consumer. Therefore, the performance of the data processing system is improved.

It will be appreciated that one or both of the producer and consumer could also be provided with subscription determination circuitry 250 as previously described. In doing so, it would not be necessary to include subscription instructions as set out in the above pseudocode. Instead, subscription indicators to indicate a subscription to the regions of memory containing the head index, the tail index, or the ring buffer 1100 may be generated by the subscription determination circuitry 250.

Figure 12:
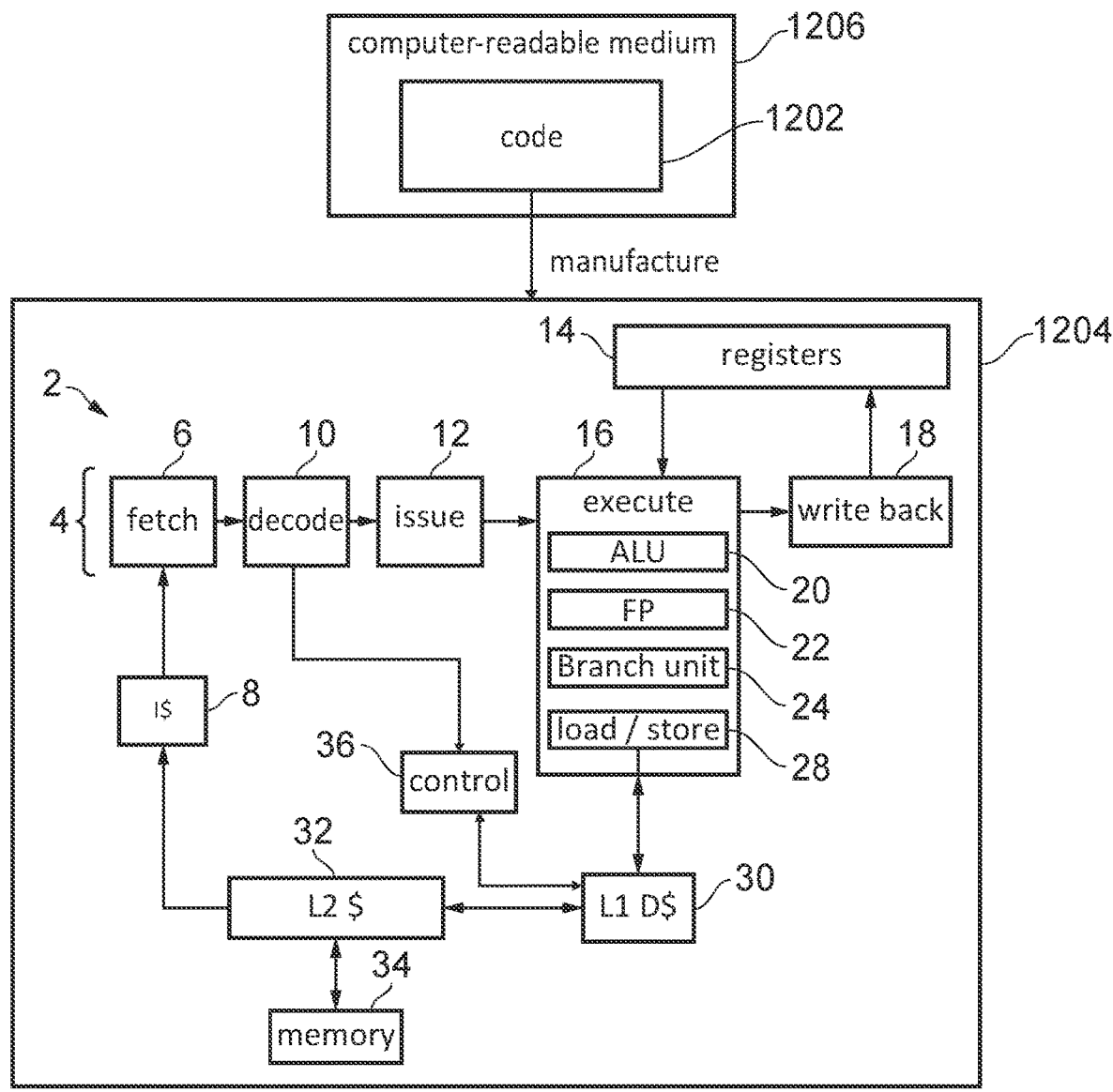
FIG. 12 schematically illustrates a computer-readable medium comprising computer-readable code for manufacturing an apparatus according to some example embodiments.

FIG. 12 illustrates an example of concepts described herein embodied in computer-readable code 1202 for fabrication of an apparatus 1204 that embodies the described concepts. For example, the computer-readable code 1202 can be used at one or more stages of a semiconductor design and fabrication process, including an electronic design automation (EDA) stage, to fabricate an integrated circuit comprising the apparatus 1204 embodying the concepts. The above computer-readable code 1202 may additionally or alternatively enable the definition, modelling, simulation, verification and/or testing of an apparatus 1204 embodying the concepts described herein.

For example, the computer-readable code 1202 for fabrication of an apparatus 1204 embodying the concepts described herein can be embodied in code defining a hardware description language (HDL) representation of the concepts. For example, the code 1202 may define a register-transfer-level (RTL) abstraction of one or more logic circuits for defining an apparatus 1204 embodying the concepts. The code 1202 may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code 1202 may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code 1202 may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code 1202 a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

Such computer-readable code 1202 can be disposed in any known transitory computer-readable medium 1206 (such as wired or wireless transmission of code over a network) or non-transitory computer-readable medium 1206 such as semiconductor, magnetic disk, or optical disc. An integrated circuit fabricated using the computer-readable code 1202 may comprise components such as one or more of a central processing unit, graphics processing unit, neural processing unit, digital signal processor or other components that individually or collectively embody the concept.

Some examples of the present invention are set out in the following clauses:

(1) An apparatus comprising:
subscription storage circuitry for storage of a subscription indicator indicating a subscription to a region of memory;
control circuitry configured to generate, in response to an invalidation in a cache of a cache line holding a data block corresponding to the region of memory for which the subscription is indicated, a re-fetch request specifying the data block after a delay, and to cause the data block to be stored in the cache.

(2) The apparatus of clause (1), comprising:
decoding circuitry configured to decode a subscription instruction indicating the region of memory, wherein
in response to the subscription instruction, the decoding circuitry is configured to generate control signals which cause the subscription indicator to be stored in the subscription storage circuitry.

(3) The apparatus of clause (1) or clause (2), comprising:
subscription determination circuitry configured to store the subscription indicator in the subscription storage circuitry in response to at least one of:
receiving a snoop request indicating an intent to modify the data block; and
a number of times that the data block has been allocated to the cache exceeding a threshold within a monitoring period.

(4) The apparatus of any of clauses (1) to (3), wherein the control circuitry is responsive to storage of the subscription indicator in the subscription storage circuitry, to determine whether the data block is currently stored in the cache, and
in response to a determination that the data block is not currently validly stored in the cache, the control circuitry is configured to generate a fetch request specifying the data block.

(5) The apparatus of any of clauses (1) to (4), wherein the subscription indicator comprises an indication of the region of memory, and the subscription storage circuitry comprises a storage element separate from the cache.

(6) The apparatus of any of clauses (1) to (5), wherein the control circuitry is configured to cancel the subscription indicator in response to storage of a new subscription indicator in the storage element, when
the storage element has insufficient storage capacity to store the new subscription indicator in addition to the subscription indicator.

(7) The apparatus of any of clauses (1) to (6), wherein
the subscription indicator is stored in a field of the cache
line holding the data block corresponding to the region
of memory.

(8) The apparatus of clause (7), wherein
the field of the cache line is configured to store a flag.

(9) The apparatus of any of clauses (1) to (7), wherein
the subscription indicator comprises a delay value; and
the delay is based on the delay value.

(10) The apparatus of clause (9), wherein
the control circuitry is configured to adjust the delay value
in response to at least one of:
a further invalidation of the cache line within a re-invalidation time of the invalidation; and
a determination of whether the cache received a memory access request specifying the cache line within the re-invalidation time.

(11) The apparatus of clause (9), wherein
the control circuitry is configured to adjust the delay value based on whether the data block is indicated as being read-only or having shared ownership with another processing element or indicated as having been modified by another processing element.

(12) The apparatus of any of clauses (1) to (11), wherein
the subscription indicator comprises a confidence value, wherein
in response to the confidence value being below a confidence threshold, the control circuitry is configured to treat the subscription as not indicated.

(13) The apparatus of clause (12), wherein
the control circuitry is configured to increase the confidence value in response to at least one of:
the data block being stored in the cache in response to a data processing instruction; and
receiving a snoop request specifying the cache line while the cache line is stored in the cache and the subscription indicator is stored in the subscription storage circuitry.

(14) The apparatus of clause (12) or clause (13), wherein
the control circuitry is configured to decrease the confidence value in response to at least one of:
an exception; and
expiry of a subscription ageing period.

(15) The apparatus of any of clauses (1) to (14), wherein
the control circuitry is configured to move the subscription indicator to further storage circuitry; and
in response to a subsequent re-subscription to the region of memory, the control circuitry is configured to cause the subscription indicator to be moved from the further storage circuitry to the subscription storage circuitry.

(16) The apparatus of any of clauses (1) to (15), wherein
the control circuitry is configured to cancel the subscription indicator in response to the cache line holding the data block corresponding to the region of memory being evicted from the cache.

(17) The apparatus of clause (16), wherein
the cache is configured to prioritise evicting a different cache line over the cache line holding the data block corresponding to the region of memory.

(18) The apparatus of any of clause (1) to (17), wherein
the cache is coupled to a processing element; and
the invalidation of the cache line is in response to an invalidation request from a further processing element; and
the control circuitry is configured to cause the re-fetch request to be sent as a snoop request to the further processing element.

(19) A data processing system comprising:
the apparatus of any of clauses (1) to (18);
a further system component configured to generate an invalidation request, and to send the invalidation request to the apparatus;
the apparatus is configured to cause the invalidation of the cache line holding the data block in response to the invalidation request; and
the control circuitry is configured to cause the re-fetch request to be sent to the further system component.

(20) A method comprising:
storing a subscription indicator indicating a subscription to a region of memory;
generating, in response to an invalidation in a cache of a cache line holding a data block corresponding to the region of memory for which the subscription is indicated, a re-fetch request specifying the data block after a delay, and causing the data block to be stored in the cache.

(21) A non-transitory computer-readable medium to store computer-readable code for fabrication of an apparatus comprising:
subscription storage circuitry for storage of a subscription indicator indicating a subscription to a region of memory;
control circuitry configured to generate, in response to an invalidation in a cache of a cache line holding a data block corresponding to the region of memory for which the subscription is indicated, a re-fetch request specifying the data block after a delay, and to cause the data block to be stored in the cache.

In brief overall summary, the present techniques allow for particularly important data in cache line to be marked as subscribed by a data processing apparatus executing program instructions. When a cache line is marked as such, actions are taken to reduce the amount of time that the cache line is absent from the cache after an invalidation. This is particularly useful for reducing the time in which a cache miss could occur, thus reducing the possibility of a loss of performance associated with the latency of retrieving data from lower levels of a cache hierarchy or main system memory.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
subscription storage circuitry configured to store a subscription indicator indicating a subscription to a region of memory;
control circuitry configured to generate, in response to an invalidation in a cache of a cache line holding a data block corresponding to the region of memory for which the subscription is indicated, a re-fetch request specifying the data block after a delay, and to cause the data block to be stored in the cache; and
decoding circuitry configured to decode a subscription instruction indicating the region of memory, wherein
in response to the subscription instruction, the decoding circuitry is configured to generate control signals which cause the subscription indicator to be stored in the subscription storage circuitry.

2. An apparatus comprising:
subscription storage circuitry configured to store a subscription indicator indicating a subscription to a region of memory;
control circuitry configured to generate, in response to an invalidation in a cache of a cache line holding a data block corresponding to the region of memory for which the subscription is indicated, a re-fetch request specifying the data block after a delay, and to cause the data block to be stored in the cache; and
subscription determination circuitry configured to store the subscription indicator in the subscription storage circuitry in response to at least one of:
receiving a snoop request indicating an intent to modify the data block; and
a number of times that the data block has been allocated to the cache exceeding a threshold within a monitoring period.

3. The apparatus of claim 1, wherein
the control circuitry is responsive to storage of the subscription indicator in the subscription storage circuitry, to determine whether the data block is currently stored in the cache, and
in response to a determination that the data block is not currently validly stored in the cache, the control circuitry is configured to generate a fetch request specifying the data block.

4. The apparatus of claim 1, wherein
the subscription indicator comprises an indication of the region of memory, and the subscription storage circuitry comprises a storage element separate from the cache.

5. The apparatus of claim 4, wherein
the control circuitry is configured to cancel the subscription indicator in response to storage of a new subscription indicator in the storage element, when
the storage element has insufficient storage capacity to store the new subscription indicator in addition to the subscription indicator.

6. The apparatus of claim 1, wherein
the subscription indicator is stored in a field of the cache line holding the data block corresponding to the region of memory.

7. The apparatus of claim 6, wherein
the field of the cache line is configured to store a flag.

8. The apparatus of claim 1, wherein
the subscription indicator comprises a delay value; and
the delay is based on the delay value.

9. The apparatus of claim 8, wherein
the control circuitry is configured to adjust the delay value in response to at least one of:
a further invalidation of the cache line within a re-invalidation time of the invalidation; and
a determination of whether the cache received a memory access request specifying the cache line within the re-invalidation time.

10. The apparatus of claim 8, wherein
the control circuitry is configured to adjust the delay value based on whether the data block is indicated as being read-only or having shared ownership with another processing element or indicated as having been modified by another processing element.

11. The apparatus of claim 1, wherein
the subscription indicator comprises a confidence value, wherein
in response to the confidence value being below a confidence threshold, the control circuitry is configured to treat the subscription as not indicated.

12. The apparatus of claim 11, wherein
the control circuitry is configured to increase the confidence value in response to at least one of:
the data block being stored in the cache in response to a data processing instruction; and
receiving a snoop request specifying the cache line while the cache line is stored in the cache and the subscription indicator is stored in the subscription storage circuitry.

13. The apparatus of claim 11, wherein
the control circuitry is configured to decrease the confidence value in response to at least one of:
an exception; and
expiry of a subscription ageing period.

14. The apparatus of claim 1, wherein
the control circuitry is configured to move the subscription indicator to further storage circuitry; and
in response to a subsequent re-subscription to the region of memory, the control circuitry is configured to cause the subscription indicator to be moved from the further storage circuitry to the subscription storage circuitry.

15. The apparatus of claim 1, wherein
the control circuitry is configured to cancel the subscription indicator in response to the cache line holding the data block corresponding to the region of memory being evicted from the cache.

16. The apparatus of claim 15, wherein
the cache is configured to prioritise evicting a different cache line over the cache line holding the data block corresponding to the region of memory.

17. The apparatus of any of claim 1, wherein
the cache is coupled to a processing element; and
the invalidation of the cache line is in response to an invalidation request from a further processing element; and
the control circuitry is configured to cause the re-fetch request to be sent as a snoop request to the further processing element.

18. A data processing system comprising:
the apparatus of claim 1;
a further system component configured to generate an invalidation request, and to send the invalidation request to the apparatus;
the apparatus is configured to cause the invalidation of the cache line holding the data block in response to the invalidation request; and
the control circuitry is configured to cause the re-fetch request to be sent to the further system component.

19. A method comprising:
- storing, in subscription storage circuitry, a subscription indicator indicating a subscription to a region of memory;
- generating, in response to an invalidation in a cache of a cache line holding a data block corresponding to the region of memory for which the subscription is indicated, a re-fetch request specifying the data block after a delay, and causing the data block to be stored in the cache; and
- in response to a subscription instruction indicating the region of memory, generating control signals which cause the subscription indicator to be stored in the subscription storage circuitry.

\* \* \* \* \*